US005239405A

United States Patent [19]

Varaprasad et al.

[11] Patent Number: 5,239,405
[45] Date of Patent: Aug. 24, 1993

[54] ELECTROCHEMICHROMIC SOLUTIONS, PROCESSES FOR PREPARING AND USING THE SAME, AND DEVICES MANUFACTURED WITH THE SAME

[75] Inventors: Desaraju V. Varaprasad, Holland, Mich.; Steven D. Looman, Salt Lake City, Utah; Mingtang Zhao, Holland, Mich.; Hamid R. Habibi, Holland, Mich.; Niall R. Lynam, Holland, Mich.

[73] Assignee: Donnelly Corporation, Holland, Mich.

[21] Appl. No.: 756,342

[22] Filed: Sep. 6, 1991

[51] Int. Cl.$^5$ .......................... G02F 1/15; G02F 1/53; G02F 1/00; G02B 5/23
[52] U.S. Cl. ..................... 359/272; 359/270; 359/265; 252/583; 252/586
[58] Field of Search ....................... 359/270, 272, 265; 252/586, 583

[56] References Cited

U.S. PATENT DOCUMENTS

| | | |
|---|---|---|
| 3,280,701 | 10/1966 | Donnelly et al. |
| 3,282,157 | 11/1966 | Jones et al. |
| 3,282,158 | 11/1966 | Jones et al. |
| 3,282,160 | 11/1966 | Jones et al. |
| 3,283,656 | 11/1966 | Jones et al. |
| 3,451,741 | 6/1969 | Manos . |
| 3,453,038 | 7/1969 | Kissa et al. |
| 3,521,941 | 7/1970 | Deb et al. ........................ 350/160 |
| 3,652,149 | 3/1972 | Rogers ............................. 350/160 |
| 3,692,388 | 9/1972 | Hall, Jr. et al. ................. 350/312 |
| 3,774,988 | 11/1973 | Rogers ............................. 350/150 |
| 3,806,229 | 4/1974 | Schoot et al. .................... 350/160 |
| 3,854,794 | 12/1974 | Van Dam et al. ................ 350/160 |
| 3,873,185 | 3/1975 | Rogers ............................. 350/147 |
| 3,912,368 | 10/1975 | Ponjee et al. .................... 350/160 |
| 3,951,845 | 4/1976 | Cole, Jr. .......................... 252/299 |
| 4,090,782 | 5/1978 | Bredfeldt et al. ................ 350/357 |
| 4,093,358 | 6/1978 | Shattuck et al. ................. 350/357 |
| 4,139,234 | 2/1979 | Morgan .............................. 296/84 |
| 4,139,276 | 2/1979 | Clecak et al. .................... 350/357 |
| 4,210,390 | 7/1980 | Yaguchi ............................ 350/357 |
| 4,309,082 | 1/1982 | Kohara et al. ................... 350/357 |
| 4,561,001 | 12/1985 | Gunn et al. ....................... 346/218 |
| 4,561,625 | 12/1985 | Weaver ............................... 249/85 |

(List continued on next page.)

FOREIGN PATENT DOCUMENTS

| | | |
|---|---|---|
| A6804290 | 2/1991 | Australia . |
| 0012419 | 6/1980 | European Pat. Off. . |
| 0240226 | 10/1987 | European Pat. Off. . |
| 0430684 | 6/1991 | European Pat. Off. . |
| 56-93742 | 12/1982 | Japan . |
| 56-93743 | 12/1982 | Japan . |
| 566863 | 8/1977 | U.S.S.R. . |
| 328017 | 5/1930 | United Kingdom . |
| 1314049 | 4/1973 | United Kingdom . |

OTHER PUBLICATIONS

R. Hirohashi et al., "The Effect of Substituent on the Colored States of Viologen Derivatives", Nippon Shashin Gakkaishi, 51, 1, pp. 91–15 (1988).

(List continued on next page.)

Primary Examiner—Bruce Y. Arnold
Assistant Examiner—Evelyn A. Lester
Attorney, Agent, or Firm—Fitzpatrick, Cella, Harper & Scinto

[57] ABSTRACT

The present invention relates to electrochromic solutions and devices manufactured therefrom. More precisely, the invention relates to electrochemichromic solutions, and those devices manufactured with the same, that demonstrate superior responsiveness to those solutions known heretofore when an applied potential is introduced thereto. That is, the responsiveness observed in terms of solution coloring is of a greater rapidity, intensity and uniformity than those electrochemichromic solutions of the prior art. Preparation of these solutions involve the novel process of pre-treating at least one of the electrochemichromic compounds with a redox agent prior to placing it in contact with the other electrochemichromic compound. Moreover, the present invention relates to methods of preparing such novel solutions and processes for using these solutions to provide devices that exhibit and benefit from the aforementioned superior characteristics.

133 Claims, 1 Drawing Sheet

U.S. PATENT DOCUMENTS

| | | | |
|---|---|---|---|
| 4,684,219 | 8/1987 | Cox et al. | 350/343 |
| 4,712,879 | 12/1987 | Lynam et al. | 350/357 |
| 4,750,817 | 6/1988 | Sammells | 350/357 |
| 4,752,119 | 6/1988 | Ueno et al. | 350/357 |
| 4,761,061 | 8/1988 | Nishiyama et al. | 350/357 |
| 4,795,242 | 1/1989 | Wudl et al. | 350/357 |
| 4,893,908 | 1/1990 | Wolf et al. | 350/357 |
| 4,902,108 | 2/1990 | Byker | 350/357 |
| 5,130,841 | 7/1992 | Demiryont | 359/265 |
| 5,140,455 | 8/1992 | Varaprasad et al. | 359/275 |
| 5,142,407 | 8/1992 | Varaprasad et al. | 359/276 |
| 5,151,816 | 9/1992 | Varaprasad et al. | 359/275 |

OTHER PUBLICATIONS

H. Kamogawa et al., "Photochromism of Viologen Crystals", Bull Chem. Soc. Jpn., 60, pp. 794–796 (1987).

I. F. Chang, *Nonemissive Electrooptic Displays*, 155–96, A. R. Kmetz and F. K. von Willisen, eds., Plenum Press, New York (1976).

C. M. Lambert, "Electronic Materials and Devices for Energy Efficient Windows", Solar Energy Materials, 11, 1–27 (1984).

Y. Hirai and C. Tani, "Electrochromism for Organic Materials in Polymeric All Solid-State Systems", Appl. Phys. Lett., 43(7), 704–05 (1983).

F. B. Kaufman, "New Organic Materials for Use as Transducers in Electrochromic Display Devices", Conf. Rec. of 1978 Biennial Display Res. Conf., 23, Society for Information Display (Oct. 24–26, 1978).

*Lange's Handbook of Chemistry*, table 5–8, J. A. Dean, Ed., 13th ed., McGraw-Hill Book Co., New York (1985).

N. R. Lynam, "Electrochromic Automotive Day-/Night Mirrors", SAE Technical Paper Series, 870636, Society for Automotive Engineers(1987) (SAE Paper I).

N. R. Lyman, "Smart Windows for Automobiles", SAE Technical Paper Series, 900419, Society for Automotive Engineers (1990) (SAE Paper II).

N. R. Lynam and A. Agrawal, "Automotive Applications of Chromogenic Materials", *Large-Area Chromogenics: Materials and Devices for Transmittance Control, SPIE Institute Series*, IS 4, 46–84, C. M. Lampert and C. G. Granquist, eds., SPIE Optical Engineering Press, Washington (1990).

R. F. Nelson et al., "Anodic Oxidation of 5,10-Dihydro-5,10-Dimethylphenazine", Z. Anal. Chem., 224, 184–96 (1967).

I.V. Shelepin et al., "Electrochromism of Organic Compounds I. Electrochemical and Spectral Properties of a System Based on Methylviologen and 3-Ethyl-2-Benzothiazolone", Electrokhima, 13(1), 32–37 (Jan. 1977) (Shelepin I).

I. V. Shelepin et al., "Electrochromism of Organic Compounds II. Spectral and Electrochemical Examination of a System Based on Methylviologen and 5,10-Dihydro-5,10-Dimethylphenazine", *Electrokhimya*, 13(3), 404–08 (Mar. 1977) (Shelepin II).

I. V. Shelepin et al., "Electrochromism of Organic Compounds. II. Spectral-Electrochemical Study of a System Based on Methylviologen and 5,10-Dihydro-5,10-Dimethylphenazine", Chem. Abs., 86:196871c, 72-Electrochemistry (1977) (Shelepin III).

O. A. Ushakov et al., "Electrochromism of Organic Compounds. Some Properties of Two-Electrode Cells", *Electrokhimya*, 14(2), 319–22 (Feb. 1978).

ELECTROCHEMICHROMIC SOLUTIONS, PROCESSES FOR PREPARING AND USING THE SAME, AND DEVICES MANUFACTURED WITH THE SAME

BACKGROUND OF THE INVENTION

1. Technical Field of the Invention

The present invention relates to electrochromic solutions and devices manufactured therefrom. More particularly, the present invention relates to electrochemichromic solutions, and devices using the same, that demonstrate superior responsiveness to those solutions known heretofore when an applied potential is introduced thereto. That is, the responsiveness observed, in terms of solution coloring, is of a greater rapidity, intensity and uniformity than those prior art electrochemichromic solutions. In addition, the present invention relates to processes for preparing such novel solutions and processes for using these solutions to manufacture devices that exhibit the aforementioned superior characteristics and accordingly benefit therefrom.

2. Brief Description of the Prior Art

Such solutions, and the devices manufactured therefrom, are known [see, e.g. U.S. Pat. Nos. 3,806,229 (Schoot), 3,280,701 (Donnelly), 3,451,741 (Manos) and 4,902,108 (Byker), commonly assigned U.S. Pat. Nos. 5,140,455 (Varaprasad), 5,142,407 (Varaprasad) and 5,151,816 (Varaprasad), and I.V. Shelepin, *Electrokhimva*, 13(3), 404–08 (Mar. 1977)].

Typically, in the context of such devices, anodic compounds and cathodic compounds are placed together in a solvent to form a solution which is then placed within a cell housed by the device. When an applied potential is introduced to the device, the solution contained within colors thereby reducing the amount of light that is transmitted therethrough.

Although prior endeavors have proven satisfactory, an improvement in the rapidity, intensity and uniformity of the solution coloring would be advantageous inasmuch as the amount of light transmitted therethrough would further be decreased and the glare resulting from the face of those devices housing the solutions would also be decreased. Such an event would benefit those commercial applications currently employing solutions of this nature and would create new opportunities for commercial activity.

Thus, it would be desirable for an electrochemichromic solution to demonstrate an enhanced rapidity, intensity and uniformity of solution coloring when the solution is influenced by the introduction of an applied potential thereto. It would also be desirable to provide a process for preparing these solutions. It would further be desirable to provide a process for using these solutions. Finally, it would be desirable to provide a device manufactured with the electrochemichromic solutions of the present invention that benefits from the above-noted advantages of these solutions when employed therewith.

SUMMARY OF THE INVENTION

Accordingly, it is an object of the present invention to provide electrochemichromic solutions that demonstrate enhanced rapidity, intensity and uniformity of solution coloring when the solution is influenced by the introduction of an applied potential thereto.

It is also an object of the present invention to provide processes for preparing these solutions.

It is a further object of the present invention to provide processes for using these solutions.

It is a final object of the present invention to provide devices manufactured with the electrochemichromic solutions of the present invention that benefit from the advantages provided by these solutions when employed therewith.

The present invention solves the aforementioned shortcomings of the prior art by providing for the first time electrochemichromic solutions capable of demonstrating enhanced rapidity, intensity and uniformity of solution coloring. Preparation of these novel solutions involve the process of pre-treating an electrochemichromic compound with a redox agent prior to use.

More specifically, the electrochemichromic solutions of this invention are comprised of an anodic compound —having been previously contacted with a redox agent to alter its valence state—, a cathodic compound and a solvent such that the redox potential of the anodic compound in an altered valence state is greater than the redox potential of the cathodic compound while each of these compounds is contacted with that solvent. In addition, ultraviolet stabilizing agents and electrolytic materials and the like may be optionally added thereto to modify the physical characteristics of these solutions.

The process for preparing these solutions comprises solubilizing the anodic compound in a solvent; contacting this solubilized anodic compound with a redox agent to alter its valence state; removing that amount (if any) of redox agent that has remained unreacted; introducing a cathodic compound to the solution containing the anodic compound having a valence state different to that when it was initially placed in solution; and introducing an applied potential to this solution to cause coloring thereof.

It is this initial pre-treatment of the anodic compound, which alters its valence state and its redox potential such that the pre-treated anodic compound bears a more positive redox potential than the cathodic compound with which it is to be placed in solution, wherein the point of novelty of the present invention lies.

Capitalizing on this, the electrochemichromic solutions of the present invention, and the processes for preparing and using the same, show utility in the manufacture of devices containing the solutions. The devices so manufactured benefit from the enhanced coloring capability of these solutions which not only affects the amount of light transmitted therethrough, but also the extent to which glare is reflected from such devices. This enhanced coloring capability may be continuously varied by controlling the magnitude, duration and polarity of the applied potential introduced thereto. Examples of such devices are mirrors—e.g., vehicular, architectural or specialty mirrors, such as those useful in periscopic or dental applications—, glazings—e.g., architectural, aeronautical or vehicular glazings like windows, sun roofs, sun visors or shade bands—, privacy or security partitions, information displays, optically attenuating contrast filters, lenses and the like.

Thus, the present invention exemplifies a further advance in the art that will become readily apparent and more greatly appreciated by a study of the detailed description taken in conjunction with the drawings which follow hereinafter.

Figure 1:
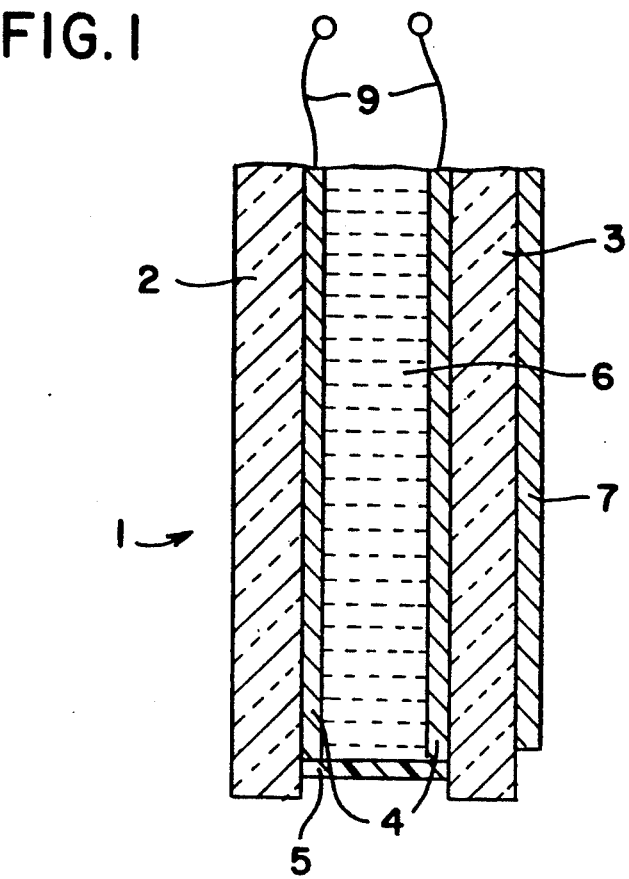
FIG. 1 depicts a sectional view of an electrochemichromic cell housing an electrochemichromic solution according to the present invention.

The depictions in these figures are for illustrative purposes and thus are not drawn to scale.

DETAILED DESCRIPTION OF THE INVENTION

In order to fully appreciate the teaching of the present invention, the following terms are defined herein. These terms and expressions employed herein are used as terms of expression only and are not meant to be construed to limit the instant teaching.

"Anodic Compound"—is meant to refer to a compound capable of undergoing a reversible color change when its valence state is altered due to oxidation.

"Bleaching"—is meant to refer to the affirmative steps of either (1) removing the applied potential, (2) applying zero potential or (3) momentarily reversing the polarity of the applied potential before performing either steps (1) or (2) so as to cause electrochemichromic compounds to revert back to their respective substantially colorless valence states.

"Cathodic Compound"—is meant to refer to a compound capable of undergoing reversible color change when its valence state is altered due to reduction.

"Color" or "Coloring"—is meant to refer to the ability of an electrochemichromic solution to decrease the amount of light transmitted therethrough thereby causing a color to form that is different than the color, or the lack of color, initially present in the solution. Thus, coloring may refer to color formation from an initially substantially colorless state or color change from one initially colored state to a substantially different colored state. It is of course to be understood that different anodic compounds and cathodic compounds, individually or in combination, may generate different color spectrums in the context of the present invention when their respective valence states are altered by an applied potential which is introduced to a solution containing those compounds.

"Electrochemichromic Compound"—is meant to refer to either an anodic compound or a cathodic compound, as defined hereinabove.

"Electrochemichromic Solution"—is meant to a solution comprising at least one electrochemichromic compound.

"Iris effect"—is meant to refer to the observation of non-uniform coloring or bleaching of an electrochemichromic solution when an applied potential is introduced to a cell housing that solution. This effect is typically due to the potential drop across the surface of the transparent conductive coatings present on the surfaces of the substrates of the electrochemichromic cell which results in the applied potential being highest adjacent to the bus bar and lowest at the center of this cell as the electrical current passes through the solution. Accordingly, it is not surprising that the solution will typically display non-uniform coloring by initially coloring the perimeter of the cell where the bus bars are located—i.e., closest to the point where the applied potential comes in contact with the electrochemichromic solution —and thereafter coloring toward the center of the cell.

"Redox Agent"—is meant to refer to any material, or means, capable of altering the valence state of an electrochemichromic compound—e.g., a reducing agent or an oxidizing agent—that has a compatible redox potential to that electrochemichromic compound being acted upon. More specifically, when the redox agent is a reducing agent, this agent should possess a lower redox potential than that of the compound being reduced thereby driving the reduction process. Contrariwise, when the redox agent is an oxidizing agent, this agent should possess a higher redox potential than that of the compound being oxidized thereby driving the oxidation process. Regarding a means for altering the valence state of an electrochemichromic compound, an electrochemical means is suitable.

"Response Time"—is meant to refer to that period of time required for the electrochemichromic compound present in solution to change initially from a valence state that is substantially colorless to a valence state bearing color, or vice versa (see Bleaching). Alternatively, this time may refer to that period of time required for an electrochemichromic compound to change from a valence state bearing one color to a valence state bearing a substantially different color. This period of time will often vary depending on the specific physical characteristics and concentrations of the constituents present in the electrochemichromic solution and the operating conditions and physical construction of the electrochemichromic system. In addition, the response time may not be, and often is not, the same for the reverse processes of solution coloring and solution bleaching.

"Valence State"—is meant to refer to a state of oxidation or reduction of a given electrochemichromic compound. In that regard, an altered valence state is merely an alteration in valence state. The gain of one or more electrons (reduction) will lower the valence state whereas the loss of one or more electrons (oxidation) will raise the valence state of the electrochemichromic compound. "Self-erasing"—is meant to refer to the substantially spontaneous fading of solution color—i.e., an increase of light transmittance—hwen the applied potential is removed from the solution. This feature is provided by the spontaneous reactions of oxidized anodic compounds with reduced cathodic compounds to afford anodic compounds and cathodic compounds in their respective valence states—i.e., those valence states which display the least, or substantially no, color.

In accordance with the teaching of the present invention, the anodic compound and the cathodic compound may each comprise one pr more individual electrochemichromic compounds. Further, while the number of individual electrochemichromic compounds comprising the anodic compound is independent of the number of individual electrochemichromic compounds comprising the cathodic compound, that is not to say that the anodic compound and the cathodic compound may not comprise the same number of different individual electrochemichromic compounds. Rather, it merely indicates that the number of different individual electrochemichromic compounds comprising either the anodic compound or the cathodic compound does not depend on the identity of those individual electrochemichromic compounds chosen.

With this in mind, the anodic compound, prior to contacting with a redox agent, may be selected from the class of chemical compounds represented by the following formula

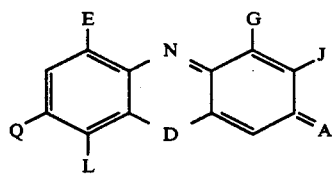

wherein

A is O, $NRR_1$; wherein R and R may be the same or different and each may be selected from the group consisting of H or any straight-chain or branched alkyl constituent having from about one carbon atom to about six carbon atoms, such as $CH_3$, $CH_2CH_3$, $CH_2CH_2CH_3$, $CH(CH_3)_2$ and the like, provided that when A is $NRR_1$, Q is H or OH;

D is O S;

E is R, COOH, $CONH_2$, phenyl, 2,4-dihydroxyphenyl;

G is H;

J is phenyl, 2,4-dihydroxyphenyl; or G and J, when taken together, represent an aromatic ring structure having six ring carbon atoms when viewed in conjunction with the ring carbon atoms to which they are attached;

L is H, OH; and

Q is H, OH, NRR, provided that when L and Q are OH, L and Q may also be any salt thereof.

Those salts include, but are not limited to, alkali metal salts, such as lithium, sodium, potassium and the like. In addition, when A is $NRR_1$, tetrafluoroborate ($BF_4$), perchlorate ($ClO_4$), trifluoromethane sulfonate ($CF_3SO_3^-$), hexafluorophosphate ($PF_6^-$) and any halogen may be associated therewith. Moreover, the ring nitrogen atom in this chemical formula may also appear as an N-oxide.

Preferably, the anodic compound represented by formula I, prior to contacting with a redox agent, may be selected from the group consisting of the class of chemical compounds represented by the following formulae

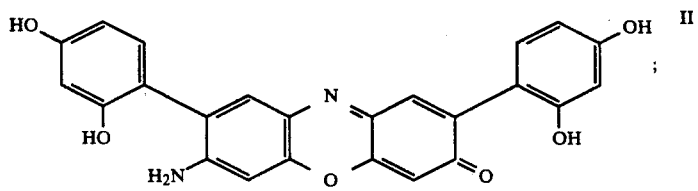

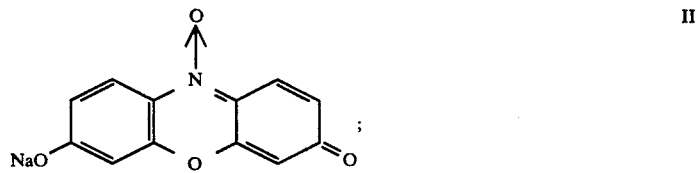

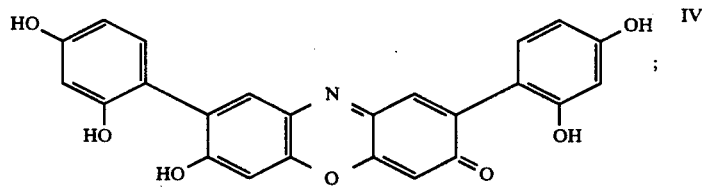

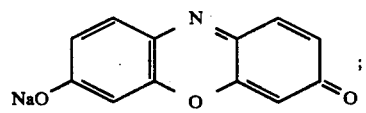

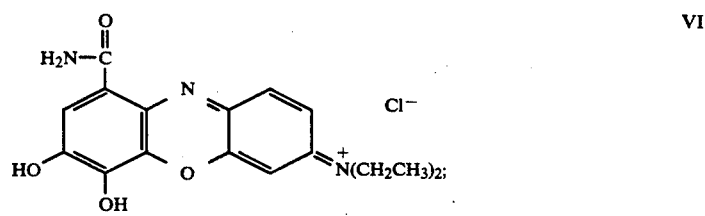

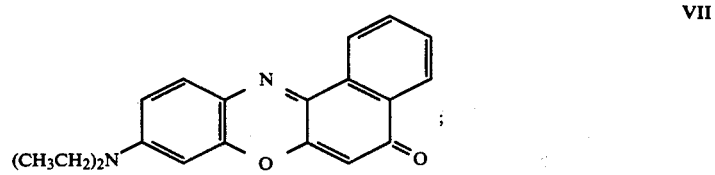

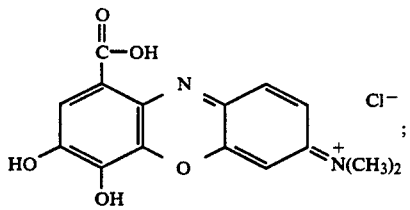

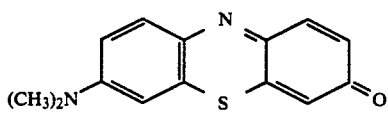

methylene violet
(Bernthsen)
(MVTB)

and any combination thereof.

Most preferably, the anodic compound, prior to contacting with a redox agent, is MVTB.

Similarly, a choice of cathodic compound should be made. The cathodic compound may be selected from the class of chemical compounds represented by the following formulae

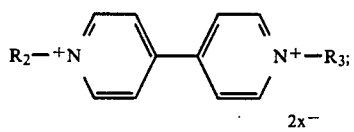

X

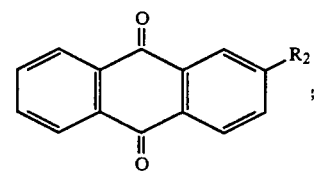

XI

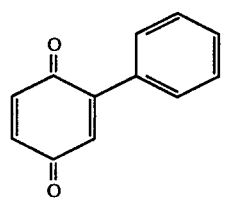

XII wherein $R_2$ and $R_3$ may be the same or different and each may be selected from the group consisting of H or any straight-chain or branched alkyl constituent having from about one carbon atom to about six carbon atoms; and X is selected from the group consisting of $BF_4$, $ClO_4$, $CF_3SO_3$, $PF_6$, any halogen and any combination thereof.

Preferably, $R_2$ and $R_3$ in these chemical formulae which represent the cathodic compound are each $CH_2CH_3$. Thus, when X is $ClO_4$, a preferred cathodic compound is ethylviologen perchlorate ($EVClO_4$).

The redox agent that is employed in the present invention to pre-treat the anodic compound may be chosen from a host of materials that demonstrate the ability to alter the valence state of such an anodic compound. While not intending to be bound by theory, the redox agent should possess a compatible redox potential

VIII

·

IX to that electrochemichromic compound with which it is to be placed in contact. Although the redox agents may be in any physical form—i.e., a solid, liquid or gaseous state—, a solid redox agent is typically preferred because of its ease of handling and use. Moreover, solid redox agents having a fine particle size—e.g., about 50 mesh to about 400 mesh—are also preferred because of the larger surface area provided. Alternatively, when in the gaseous state, the redox agent may advantageously be passed through a solution of an anodic compound by, for example, bubbling the gaseous redox agent through an airstone disperser.

When the chosen redox agent is a reducing agent, suitable materials that are representative candidates for use therefor may be drawn from the following non-exhaustive recitation including zinc, ascorbic acid, sodium hydrosulfite, vanadium (III) chloride, chromium (II) acetate, sulfur dioxide and any combination thereof. Preferred among these reducing agents, however, is zinc. When an electrochemical means is chosen as the reducing agent, a conventional electrochemical apparatus capable of providing a negative electrochemical potential may be used.

The redox agent for use in the instant invention may also be an oxidizing agent. In such a case, suitable materials include, but are not limited to, air, oxygen, sodium persulfate, MVTB and any combination thereof. Also, when an electrochemical means is chosen as the oxidizing agent, a conventional electrochemical apparatus capable of providing a positive electrical potential may be used.

The solvent of choice for solubilizing the aforementioned anodic compounds and cathodic compounds should remain substantially inert to those compounds, as well as to any other constituent initially present in the electrochemichromic solution, or formed as a by-product thereafter, so as not to interfere with the electrochemical reactions occurring with respect to those electrochemichromic compounds. To that end, the solvent chosen should be capable of solubilizing those anodic compounds and those cathodic compounds while each is in its ground valence state as well as when each is in its altered valence state, or for that matter, when the two electrochemichromic compounds are not in the same valence state—i.e., ground valence state, a high energy valence state or different high energy valence states. Thus, the different levels of solubility for different electrochemichromic compounds present in different valence states should be considered when choosing a solvent for the solutions of the subject invention. Further, the solvent should remain homogenous while preparing, using and storing the electrochemichromic solutions. Put another way, the solvent chosen should not encourage the constituents of the electrochemichromic solutions, or by-products thereof, to salt-out or precipitate from the solution, for such an event would interfere with the appearance and the effectiveness of the electrochemichromic cell and is thus obviously disadvantageous.

In that regard, any solvent that remains in its liquid form over the range of temperatures that the devices manufactured with the electrochemichromic solutions of the present invention will likely be subjected to is suitable for use as a solvent herein [for a nonexhaustive recitation of suitable materials, see, e.g. commonly assigned U.S. Pat. Nos. 5,142,407 (Varaprasad) and 5,151,816 (Varaprasad). Practically speaking, those solvents should be stable to electrolysis and other phenomena likely to be encountered during the practice of this invention.

Although any of those solvents identified above are suitable, preferable solvents may be selected from acetonitrile, 3-hydroxypropionitrile, methoxypropionitrile, 3-ethoxypropionitrile, 2-acetylbutyrolactone, propylene carbonate, cyanoethyl sucrose, γ-butyrolactone, 2-methylglutaronitrile, N,N'-dimethylformamide, 3-methylsulfolane, glutaronitrile, 3,3'-oxydipropionitrile, methylethyl ketone, cyclopentanone, cyclohexanone, benzoyl acetone, 4-hydroxy-4-methyl-2-pentanone, acetophenone, 2-methoxyethyl ether, triethylene glycol dimethyl ether and any combination thereof. Particularly preferred solvents among that group are the combination of 3-ethoxypropionitrile with 2-acetylbutyrolactone in about 50:50, 75:25 and 80:20 ratios (v/v) and the combination of 3-ethoxypropionitrile with 2-acetylbutyrolactone and cyanoethyl sucrose in about a 55:15:30 ratio (v/v).

Additional particularly preferred solvents include, but are not limited to, solvents comprising a combination of propylene carbonate and glacial acetic acid, a combination of 3-hydroxypropionitrile and glacial acetic acid, a combination of glutaronitrile and glacial acetic acid, a combination of 3,3'-oxydipropionitrile and glacial acetic acid, a combination of 3-methylsulfolane and glacial acetic acid, a combination of propylene carbonate, cyanoethyl sucrose and glacial acetic acid and the like. Specifically, those solvents include the combination of 3-hydroxypropionitrile with glutaronitrile and glacial acetic acid in about 74:25:1 and about 49.5:49.5:1 ratios, the combination of 3-hydroxypropionitrile with 3,3'-oxydipropionitrile and glacial acetic acid in about a 69:30:1 ratio, the combination of propylene carbonate with glacial acetic acid in about a 99:1 ratio, the combination of propylene carbonate with cyanoethyl sucrose and glacial acetic acid in about a 64:35:1 ratio and the like. And, the glacial acetic acid or acidic solvent component may be added while the combination is being prepared as a percentage of the total volume of that solvent.

To that end, it is believed that such acidic solvents not only catalyze the initial pre-treatment reaction—i.e., the reaction between the redox agent and the anodic compound—but also assist to keep the pretreated anodic compound, in its altered valence state, from acting as a redox agent toward the cathodic compound when the two electrochemichromic compounds are combined in solution at the outset. In the event that a cathodic compound possesses a more negative redox potential than that of the anodic compound, these compounds may be employed in the absence of an acidic solvent.

Notwithstanding this event, in addition to glacial acetic acid, almost any acidic solvent component, such as hydrogen halide gases in solution, perchloric acid, 2-acetylbutyrolactone, 3-hydroxypropionitrile and any combination thereof, may suffice provided that it is substantially anhydrous and further provided that it is chemically and electrochemically inert toward the electrochemichromic compounds engaged in the present invention. Alternatively, acidic solvents such as weak organic acids, like citric acid solutions, may be added to otherwise non-acidic solvents to render those solvents acidic. Preferably, however, glacial acetic acid should be employed. For a further recitation of suitable acidic solvents, see, e.g. *Lange's Handbook of Chemistry*, table 5–8, J. A. Dean, ed., 13th ed., McGraw-Hill Co., N.Y. (1985). In general, the solvent may be selected with an eye toward having the anodic compound, bearing an altered valence state, possess a greater redox potential than that of the cathodic compound while each is in solution.

The acidic strength of the solvent should be sufficient to bring the redox potential of the anodic compound to a more positive value than that of the cathodic compound. Where at least a binary solvent is employed, the amount of the more acidic solvent component chosen should be in the range of about 0.01% (v/v) to about 75% (v/v). However, when glacial acetic acid is chosen as the acidic solvent component, about 1% (v/v) is preferred. It is worth noting, that a higher acidic strength of the solvent in the electrochemichromic solution may cause a different solution coloring spectrum or, for that matter, a different degree of intensity of the color so formed.

In addition to altering the valence state of the anodic compound by means of a redox agent, preferably in the presence of an acidic solvent, electrochemical means may also be employed to accomplish this objective. This electrochemical reaction may be performed, both with and without the presence of an acidic solvent component, employing a conventional multi-compartment electrochemical cell equipped with a working electrode, such as a platinum electrode or the like.

Other components may also be added to the subject electrochemichromic solutions including, but not limited to, an ultraviolet stabilizing agent, an electrolytic material and any combination thereof. Because many electrochemichromic compounds, particularly anodic compounds, show a substantial ultraviolet absorbance in the ultraviolet region from about 250 nm to about 350 nm, it is often desirable to shield the electrochemichromic compounds from ultraviolet radiation. Thus, by introducing an ultraviolet stabilizing agent to the subject solution, or a solvent which acts as an ultraviolet absorber, the lifetime of the electrochemichromic solution may be extended. Although any material known to absorb ultraviolet radiation, and thereby prevent or retard the ultraviolet degradation of the constituents presently in solution, may be employed to achieve the desired stabilizing result, provided that it is inert to those constituents and stable over the conditions of operation of the subject electrochemichromic solutions, an ultraviolet stabilizing agent, such as "UVINUL 400", "UVINUL D-49", "TINUVIN P", "TINUVIN 327", "TINUVIN 328", "Cyasorb 24", benzotriazole or conventional benzotriazole derivatives, benzophenone or conventional benzophenone derivatives, or many sterically hindered amine complexes known in the art and any combination thereof, is preferred. In fact, "UVINUL 400" is a most preferred ultraviolet stabilizing agent and it may be advantageously used in the range of about 0.1% (w/v) to about 10% (w/v), with about 5% (w/v) being preferred.

An electrolytic material may also be employed in the electrochemichromic solutions to assist or enhance the conductivity of the electrical current passing therethrough, and particularly when no electrochemichromic compound of the electrochemichromic solution or any other solution component exists in an ionic state. That material may be selected from a host of known materials inert to the constituents and stable over the conditions of operation of the subject solutions. Preferred electrolytic materials include tetraethylammonium perchlorate, tetrabutylammonium tetrafluoroborate, tetrabutylammonium hexafluorophosphate, tetrabutylammonium trifluoromethane sulfonate and any combination thereof, with tetrabutylammonium hexafluorophosphate and tetraethylammonium perchlorate being most preferred. Although impractical to specify absolute ranges for all possible electrolytic materials within the scope of this invention, if tetrabutylammonium hexafluorophosphate is chosen as the electrolytic material, a concentration of about equimolar to about five times the concentration of the electrochemichromic compounds is preferred.

Again, without intending to be bound by theory, an understanding of the triggering events which make this invention operational is instructive in the context of a preferred embodiment for preparing these electrochemichromic solutions and in a device manufactured with the same. In this connection, an anodic compound, such as MVTB, initially provided in its higher valence state as compared with the valence state that it will reach when contacted with a redox agent may be dissolved in any of the solvents identified herein, such as the combination of 3-ethoxypropionitrile with 2-acetylbutyrolactone in about an 80:20 ratio (v/v), so that a colored solution of that compound is formed.

The resulting solution may then be contacted with a redox agent, particularly a reducing agent, such as zinc, so that the anodic compound is reduced to a lower valence state and to a less colored form in solution. This reduction causes the anodic compound to gain at least one electron thereby causing the now reduced anodic compound-containing solution to lose substantially all of its color.

The preferred redox agent should be substantially insoluble in the preferred solvent used in the electrochemichromic solution of the present invention —i.e., being only soluble to the extent necessary to act upon the anodic compound—so that it may be easily removed by conventional separation means, such as filtering, decanting or the like. When the redox agent is substantially insoluble in the solvent employed therewith, it may alternatively be advantageous to solubilize the redox agent and the anodic compound in water and, once the redox reaction has occurred, thereafter extract the anodic compound (now bearing an altered valence state) from the aqueous solution with a substantially water-immiscible electrochemichromic solvent. Alternatively, the redox agent may indeed be soluble in that solvent, provided that it may be readily removed by other conventional separation means—such as, centrifuging, precipitating, extracting, fractionating, osmosis, vacuum or other separation means known to one of ordinary skill in the art. Although it is generally preferable to use a molar excess of an insoluble redox agent, when a soluble redox agent is employed, it may be advantageous to use only about a stoichiometric amount thereof so that no excess redox agent is permitted to remain and thus interfere with subsequent reactions that the electrochemichromic compounds present in solution may undergo.

While the redox agent to be used in the context of the present invention will typically be a reducing agent, it is within the scope of the present invention for the redox agent to be an oxidizing agent as well. In this connection, an electrochemichromic compound may be contacted with an oxidizing agent to alter its valence state—i.e., the compound assumes a higher valence state than its valence state prior to having been contacted with the oxidizing agent. For example, a viologen compound, such as $EVClO_4$, provided in its reduced colored form, may be employed. To a solution of this compound, an oxidizing agent, such as air or oxygen, may be introduced as a stream of bubbles to oxidize the reduced viologen compound to its substantially colorless form so that it serves as a cathodic compound. Excess oxidizing agent should thereafter be removed. Where a gaseous oxidizing agent is employed, the application of a vacuum—i.e., a reduced atmospheric pressure—or the introduction of a stream of bubbles of an inert gas should drive the excess gaseous oxidizing agent from the solution.

After removing that amount (if any) of redox agent that has remained unreacted, an anodic compound may be introduced to this solution. The anodic compound chosen should bear a redox potential in the solvent that is greater than the redox potential of the cathodic compound in that solvent. Once combined in solution, these two electrochemichromic compounds now act in concert like redox indicators.

The anodic compound and the cathodic compound (both typically present in solution initially in their respective substantially colorless or least colored forms), should reach a total electrochemichromic compound concentration in solution of about 0.005 M to about 0.5 M, with a level of about 0.04 M being preferred. The ratio of total anodic compound to total cathodic compound may be in the range of about 5:1 to about 1:5, with a ratio of about 1:1 being preferred. In addition, as discussed supra, it is contemplated by the present invention that this range be inclusive of the fact that the anodic compound may be comprised of different individual anodic compounds and that the cathodic compound may be comprised of different individual cathodic compounds in these electrochemichromic solutions or, for that matter, different individual anodic compounds and different individual cathodic compounds may be employed simultaneously within an electrochemichromic solution of the instant invention.

It is further contemplated that, alternatively, the cathodic compound may be contacted with a redox agent to alter its valence state. This compound (now bearing an altered valence state) may then be introduced to a solution containing the anodic compound, wherein the anodic compound is in its ground valence state or a lower valence state than the valence state that it will reach at steady state equilibrium. For instance, when the cathodic compound is EVClO., it may be placed in solution and thereafter contacted with a redox agent— e.g., a reducing agent—to alter its valence state thereby producing a solution bearing intense color. A solution of an anodic compound, in this case, MVTB, may then be added dropwise to the solution containing the reduced cathodic compound so as to act as a redox agent itself—i.e., an oxidizing agent—and oxidize the reduced cathodic compound (in what amounts to a titration) to form, at its stoichiometric end-point, a substantially colorless solution. In this way, the electrochemichromic compounds also act in concert similar in behavior to redox indicators. The resulting solution may then be used as the electrochemichromic solutions described above to manufacture devices capable of coloring when an applied potential is introduced thereto.

Since, after contacting the anodic compound with a redox agent—e.g., a reducing agent, such as zinc—substantially none of that redox agent will remain in the solution (either in a soluble form or an insoluble form), the cathodic compound may become solubilized without itself becoming reduced (and subsequently changing color) while the anodic compound may remain in a reduced form, also substantially free of color. Thus, when no applied potential is introduced to this solution, the anodic compound is present in solution in a reduced, substantially colorless form and the cathodic compound is present in solution in an oxidized, substantially colorless form—i.e., as it was when initially introduced into the solution.

The electrochemichromic solutions of the present invention, and the constituents thereof, may be flushed with anhydrous nitrogen, or any other anhydrous inert gas, prior to; and during, use and storage in order to minimize the concentration of oxygen and, if the solvent is non-aqueous, water present therein. Conventional techniques may be employed to reduce and limit the concentrations of those above-noted materials that are deemed undesirable for the instant invention. For example, anhydrous nitrogen gas may be bubbled through an electrochemichromic solution to decrease the oxygen concentration therein. Solvents or liquid electrochemichromic constituents may alternatively, or additionally, be contacted with activated alumina or the like, in the preparation of the electrochemichromic solution. Solid electrochemichromic compounds, and other solid constituents of this electrochemichromic solutions, may be dried prior to use by elevating the temperature of their immediate environment to about 110° C., or to a temperature not to exceed its melting or decomposition temperature, with an Abderhalden drying apparatus using a suitable anhydrous solvent, such as toluene [commercially available from Aldrich Chemical Company, Inc., Milwaukee, Wis. (1986)]. Other than any of these aforementioned measures that might be employed in an attempt to reduce and limit the concentrations of oxygen and water in the solutions of the present invention, these solutions may be prepared in accordance with conventionally known methods, typically at room temperature, by simply placing the appropriate amounts of electrochemichromic compounds, or other constituents described in the instant teaching, in a disclosed solvent to achieve the desired concentrations.

Figure 2:
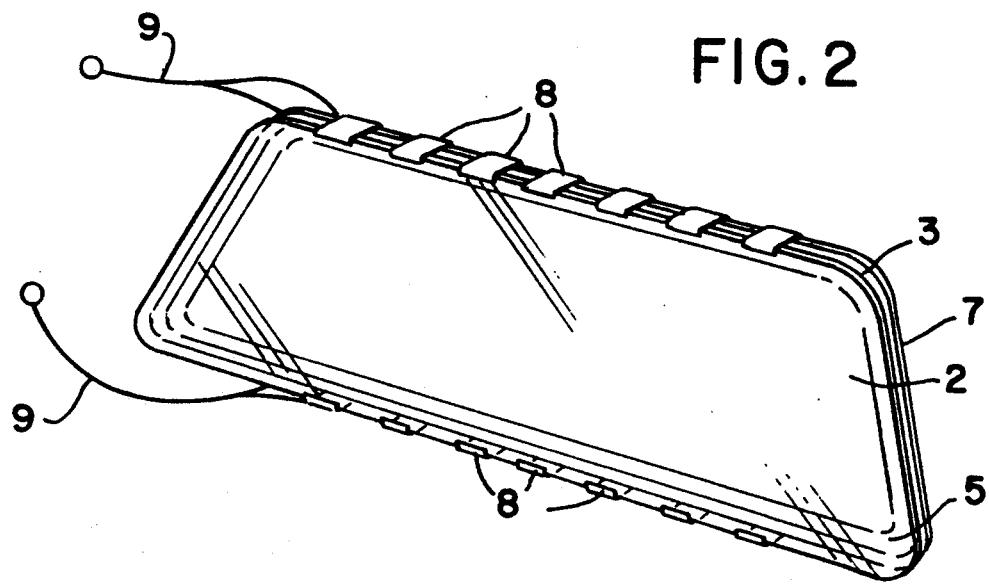
FIG. 2 depicts a perspective view of an electrochemichromic mirror assembly—i.e., an interior rearview automobile mirror—according to the present invention.

Reference to FIGS. 1 and 2 will now be made in order to more faithfully describe the operation of the cell containing these electrochemichromic solutions. It can be seen that the cell 1 includes two substantially planar glass substrates 2,3 positioned substantially parallel to one another. It is preferable that these glass substrates 2,3 be positioned as close to parallel to one another as possible so as to avoid double imaging, which is particularly noticeable in mirrors, especially when in a colored state.

Inasmuch as a source of an applied potential need be introduced to the cell 1 so that solution coloring in a rapid, intense and uniform manner may be observed, that source may be connected by electrical leads 9 to conducting strips known in the art as "bus bars". The bus bars 8 may be constructed of copper, aluminum or silver and should be affixed to the conductive coatings 4. An exposed portion of the conductive coatings 4 may be provided for the bus bars 8 to adhere to due to the spaced-apart relationship and the displacement in directions relative to one another—i.e., opposite directions relative to one another—i.e., laterally from, but parallel to the cavity which is created in the cell by the glass substrates 2,3 and the sealing means 5—of the coated glass substrates 2,3.

As stated above, on each of the interior faces of these glass substrates 2,3 is coated a transparent conductive coating 4. While the conductive coatings 4 should be of substantially uniform thickness, they may each have the same uniform thickness or different uniform thicknesses relative to each other. The conductive coatings 4 are generally from about 300 521 to about 1600 Å in thickness, with a thickness of about 1200 Å being preferred. The conductive coatings 4 should also be highly and uniformly conductive in each direction to provide a substantially uniform response once an applied potential is introduced to the solution. And, the conductive coatings 4 should be inert to the constituents of the electrochemichromic solutions so that the constituents thereof do not anodically oxidize or cathodically reduce in preference to the electrochemichromic compounds present in the solution. To this end, the conductive coatings 4 may be constructed from the same material or different materials, including tin oxide, indium tin oxide ("ITO"), antimony-doped tin oxide, fluorine-doped tin oxide, antimony-doped zinc oxide, aluminum-doped zinc oxide, with ITO being preferred. However, where the ultraviolet stability of the device is a concern, tin oxides or zinc oxides are preferred.

The sheet resistance of these ITO-coated glass substrates 2,3 may be between about 1 to about 100 ohms per square, with about 6 to about 15 ohms per square being preferred [ITO-coated substrates may be obtained commercially, for instance, from Donnelly Corporation, Holland, Mich. or, alternatively, tin oxide-coated substrates may be obtained commercially as TEC-GLASS products from Libbey-Owens-Ford Co., LOF Glass Division, Toledo, Ohio].

As stated above, the spaced-apart ITO-coated glass substrates 2,3, have sealing means 5 positioned therebetween to define the cell cavity. The sealing means 5 may be constructed of any material inert to the constituents of the electrochemichromic solutions and any subsequently formed by-products thereof. To that end, the sealing means may be chosen from the following materials including, but not limited to, various thermosetting materials, such as epoxy resins and silicones, various thermoplastic materials, such as plasticized polyvinyl butyral, polyvinyl chloride, paraffin waxes, ionomer resins, various inorganic materials and the like. For a further recitation of suitable sealing materials, see U.S. Pat. No. 4,761,061 (Nishiyama).

The thickness of the sealing means 5 may vary from about 10 $\mu$m to about 1000 $\mu$m. Preferably, however, this thickness is about 50 $\mu$m to about 100 $\mu$m. The thickness of the sealing means 5 determines the thickness of the interpane space created between the glass substrates 2,3 by the sealing means 5—i.e., the cell gap. Thus, it is the sealing means 5 which spaces or separates the ITO-coated glass substrates 2,3 from one another. In addition, sealing means 5 may prevent escape of the electrochemichromic solution 6 from the cell cavity or, for that matter, penetration of environmental contaminants into the cell cavity.

In order to fill the cell 1, a small gap—e.g., about 2mm × 1mm × 150μm—may be allowed to remain in the sealing means 5 so that an electrochemichromic solution 6 may be placed into the cell cavity during a conventional vacuum backfilling process. In the vacuum backfilling process, the empty electrochemichromic device may be placed in a chamber having reduced atmospheric pressure therein—i.e., about 1 mm Hg or lower. A container—e.g., a dish or small cup—of the solution 6 should also be placed in this chamber so that it may fill the cell cavity through the fill hole.

The fill hole of the device may then be lowered just beneath the surface of the solution in the container. When the chamber is vented to atmospheric pressure, the solution 6 is thereby forced into the cell cavity and consequently fills it.

Alternatively, the cell cavity may be formed by positioning a thermoplastic sheet, constructed of an ionomer resin, a plasticized polyvinyl butyral or the like, onto the interior surface of one of the ITO-coated glass substrates 2. This sheet may be trimmed to size about the outer periphery of one of the ITO-coated glass substrates 2 after it is placed thereover. The interior portion of the thermoplastic sheet may thereafter be trimmed so that only a border of this sheet remains about the periphery of the ITO-coated glass substrate 2. Before curing the thermoplastic sheet so that it forms the sealing means 5, an electrochemichromic solution 6 according to the present invention may be dispensed onto the surface of one of the ITO-coated glass substrates 2. It is of no moment that a portion of the solution may escape under or over the sheet, because the other ITO-coated glass substrate 3 is thereafter placed in contact therewith so that the thermoplastic sheet is positioned between the ITO-coated glass substrates 2,3 and the cell cavity which is created as a result becomes filled with the solution 6.

This construction is then temporarily clamped together and thereafter baked in an oven at a temperature of about 25° C. to about 120° C. to cure the thermoplastic sheet into the sealing means 5 that will keep intact the integrity of the cell housed in the device.

Once assembled and filled, an applied potential may be introduced to the device by the bus bars 8 in order to induce solution coloring. The applied potential may be supplied from a variety of sources including, but not limited to, any source of alternating current (AC) or direct current (DC) known in the art, provided that, if an AC source is chosen, control elements, such as diodes, should be placed between the source and the conductive coatings 4 to ensure that the potential difference between the conductive coatings 4 does not change polarity with variations in polarity of the applied potential from the source. Suitable DC sources are storage batteries, solar thermal cells, photovoltaic cells or photoelectrochemical cells.

The applied potential generated from any of these sources may be introduced to this solution in the range of about 0.001 volts to about 5.0 volts. Typically, however, an applied potential of about 0.2 volts to about 2.0 volts is preferred to permit the current to flow across the solution 6 thereby oxidizing and reducing the electrochemichromic compounds to cause solution coloring—i.e., to change the amount of light transmitted therethrough.

A means for controlling the current created by the applied potential and delivered to the conductive coatings 4 is suggested so that the current, which thereafter disperses the potential uniformly throughout the solution 6, does not exceed the potential difference at which irreversible reactions occur—e.g., solvent electrolysis, redox reactions involving the inert electrolytic material, or reactions which degrade the electrochemichromic compound. The means for controlling the current delivered to the conductive coatings 4 may be manually or automatically operated.

The solutions of the present invention, once prepared, may be advantageously employed to manufacture devices using electrochemichromic cells, such as, mirrors—e.g., vehicular, architectural or specialty mirrors, such as those useful in periscopic or dental applications—, windows—e.g., architectural or automotive glazings like sun roofs, sun visors or shade bands—, information displays, optically attenuating contrast filters, privacy or security partitions, lenses and the like.

In the context of a mirror assembly, a reflective coating 7, having a thickness in the range of 250 Å to about 2000 Å, preferably about 1000 Å, should thereafter be applied to the exterior face of one of the ITO-coated glass substrates 3 in order to form a mirror. Suitable materials for this layer are aluminum, palladium, platinum, titanium, chromium, silver and stainless steel, with silver being preferred. As an alternative to such metal thin film reflectors, multi-coated thin film stacks of dielectric materials or a high index single dielectric thin film coating may be used as a reflector. The reflective coating 7 serves not only to assist in reflecting incident light but also in conducting an applied potential to the conductive coatings 4.

It is clear from the teaching herein that should a window, sun roof or the like be desirably constructed, the reflective coating 7 need only be omitted from the assembly so that the light which is transmitted through the transparent panel is not further assisted in reflecting back therethrough.

It is also clear, that only one of the substrates that comprise the device need be at least substantially transparent. That is, provided that a surface of a conductive coating 4 of the other substrate is in contact with the electrochemichromic solution 6, a functioning device in accordance with the teaching herein may be furnished. Specifically, in a mirror device, a polished metal plate or a metal-coated glass substrate may be used or, in a display device, a conductive ceramic material may be suitably employed inasmuch as these materials are physically, chemically and electrochemically compatible with the electrochemichromic solutions themselves.

Having stated the relationship between a mirror assembly and a window assembly in connection with the teaching of the present invention, it should also be readily understood by the art-skilled that the term "transmittance" refers to the amount of light that may pass through—i.e. transmitted through—an electrochemichromic solution that is contained, for example, within an electrochemichromic window assembly. On the other hand, the term "reflectance" refers to the amount of light that may pass through—i.e., transmitted through—an electrochemichromic solution and thereafter reflect off a reflective coating placed on the back of one of the glass substrates of, for example, an electrochemichromic mirror assembly and thereafter pass back through the solution in substantially the same direction from which it originated.

In addition, one of the ITO-coated glass substrates 2 should preferably be of a laminate assembly comprising at least two transparent panels affixed to one another by a substantially transparent adhesive material. This laminate assembly assists in reducing the scattering of glass shards from the glass substrate 2 should the mirror assembly break due to impact. While the term "glass" has been employed throughout the instant disclosure, it is intended by the teaching herein that that term also include optical plastics, such as polycarbonate, acrylic and polystyrene, as well as tempered glass and laminated glass.

Once constructed, the electrochemichromic device—e.g., a mirror or window assembly—may have a molded casing placed therearound. This molded casing may be pre-formed and then placed about the periphery of the assembly or, for that matter, injection molded therearound using conventional techniques, including injection molding of thermoplastic materials, such as polyvinyl chloride or polypropylene, or reaction injection molding of thermosetting materials, such as polyurethane or other thermosets. These techniques are well-known in the art [see, e.g. U.S. Pat. Nos. 4,139,234 (Morgan) and 4,561,625 (Weaver), respectively, for a discussion of those techniques in the context of modular window encapsulation].

Each of the documents cited in the present teaching is herein incorporated by reference to the same extent as if each document had individually been incorporated by reference.

The superior rapidity, intensity and uniformity of solution coloring and the redox pre-treatment of at least one of the electrochemichromic compounds distinguishes the present teaching from the electrochemichromic solutions known heretofore and sets the present invention separate and apart therefrom.

In view of the above description of the instant invention, it is evident that a wide range of practical opportunities is provided by the teaching herein. The following examples of electrochemichromic assemblies are provided to illustrate the utility of the present invention only and are not to be construed so as to limit in any way the teaching herein.

EXAMPLES

The constituents identified in the present invention may be obtained commercially from Aldrich Chemical Company, Inc., Milwaukee, Wis. or many other chemical suppliers, unless otherwise indicated.

EXAMPLE 1

To demonstrate the difference between an electrochemichromic solution of the present invention from those electrochemichromic solutions of the prior art with respect to uniform coloring and the concomitant Iris effect, two solutions were formulated and were used in interior rearview automotive mirrors constructed as depicted in FIGS. 1 and 2. These mirrors each have a cell gap of about 80 $\mu$m with ITO—coated glass substrates having about 8 ohms per square sheet resistance and the following approximate dimensions: 6 cm $\times$ 25cm $\times$ 2mm.

In the first mirror, we placed an electrochemichromic solution comprising about 0.02 M of EVDlO$_4$ (as the cathodic compound) and about 0.02 M of 5,10-dihydro5,10-dimethylphenazine ("DMPA") (as the anodic compound), both dissolved in the solvent propylene carbonate.

In the second mirror, we placed an electrochemichromic solution prepared according to the present invention comprising about 0.02 M of EVClO$_4$ (as the cathodic compound) and about 0.02 M of MVTB (as the anodic compound), both dissolved in a solvent comprising about 99% propylene carbonate and about 1% glacial acetic acid (v/v).

In connection with the MVTB reduction, we first placed about 0.5 grams (0.002 moles) of MVTB into about 100 mls of a solvent comprising the combinatoin of about 99% propylene carbonate and about 1% acetic acid (v/v) under substantially inert conditions at about ambient temperature to about 50° C. to form a blue colored solution. We then added, with stirring, about 2 grams of zinc dust (325 mesh) thereto for a period of about 15 minutes to about 45 minutes after which period of time the solution became substantially colorless by reaching a pale yellow color. We performed this reaction under substantially the same conditions as those recited above. We removed that quantity of zinc dust which remained unreacted by filtration and thereafter contacted the substantially colorless MVTB solution (now in a reduced valence state) with the EVClO$_4$ to reach a pale bluish green solution color.

We introduced an applied potential of about 1.0 volt to each of the filled mirrors, and thereafter observed that the second mirror, filled with an electrochemichromic solution of the present invention, colored rapidly and uniformly with a negligible Iris effect as compared with the first mirror, filled with an electrochemichromic solution of the prior art.

In addition, we observed that the high reflectance at the center portion of the second mirror decreased from about 66% to about 13% in a response time of about 1.5 seconds as compared with a decrease to only about 37% in the first mirror as determined by a reflectometer—set in reflectance mode—equipped with a light source (known in the art as Illuminate A) and a photopic detector attached to a strip chart recorder. What's more, we observed that the second mirror bleached from about 16% reflectance to about 60% reflectance in a response time of about 1.2 seconds. Since the first mirror colored to only about 37%, a fair comparison with the second mirror could not be made.

EXAMPLE 2

We used the electrochemichromic solutions described in Example 1, *supra*, to fill two interior rearview automotive mirrors each having about a 100 $\mu$m cell gap and constructed from ITO-coated glass substrates having about 12 ohms per square sheet resistance. Upon application of about 1.0 volt, we observed that the second mirror, filled with an electrochemichromic solution of the present invention, colored uniformly and rapidly whereas the first mirror, filled with an electrochemichromic solution of the prior art, did not color uniformly and the electrochemichromic response obtained was less rapid. And, the second mirror demonstrated an intense bluish purple color as compared with the largely dark green color with a slight purple tint demonstrated by the first mirror.

Specifically, we observed the second mirror to exhibit color formation of about 70% reflectance to about 20% reflectance in a response time of about 1.3 seconds as compared with the first mirror which registered substantially the same reflectance effect in about 4.3 seconds. We also observed that the second mirror and the first mirror demonstrated a comparable rate of bleaching—about 1.8 seconds as compared with about 1.6 seconds, respectively—from about 20% reflectance to about 60% reflectance. In addition, we noted that although the two mirrors exhibited no marked difference with respect to their high reflectance percentage in the bleached state—about 72.6% for the second mirror d about 74.4% for the first mirror—, the second mirror showed an improvement over the first mirror with respect to decreased reflectance—i.e., about 7.9% as compared with about 16.0%, respectively. We made and recorded these observations by the detection method described in Example 1, supra.

EXAMPLE 3

We also used the electrochemichromic solutions described in Example 1, supra, to fill two automotive mirrors each having about a 135 μm cell gap and constructed from ITO-coated glass substrates having about 12 ohms per square sheet resistance to illustrate the more intense color formation demonstrated by the electrchemichromic solutions of the present invention. We constructed a cell having a wider cell gap than in the previous examples to illustrate the enhanced uniform coloring of the solution of the instant invention when Iris effects are lessened or eliminated. When we introduced an applied potential of about 1.0 volt to each mirror, we observed that the second mirror yielded a low reflectance of about 6.9% whereas the first mirror yielded a reflectance of only about 10.8%. We made and recorded these observations using the detection method described in Example 1, supra.

EXAMPLE 4

We next used the electrchemichromic solutions as described in Example 1, supra, to demonstrate the ability of the electrchemichromic solutions of the present invention to be employed with high resistive glass—an inferior quality and accordingly less expensive glass—and afford similarly superior results over those electrochemichromic solutions of the prior art. To this end, we filled two mirrors each having about a 350 μm cell gap and constructed from ITO-coated glass substrates having about 80 ohms per square sheet resistance. Upon introducing an applied potential of about 1.0 volt to each of the mirrors, we observed that the second mirror yielded a low reflectance of about 5.7% whereas the first mirror yielded a reflectance of only about 34% and also exhibited an Iris effect even with the larger cell gap. We made and recorded these observations using the detection method described in Example 1, supra.

EXAMPLE 5

In this example, we used another preferred solvent, the combination of about 79% 3-ethoxypropionitrile, about 20% 2-acetylbutyrolactone and about 1% glacial acetic acid (v/v), to further demonstrate the enhanced characteristics with respect to uniform coloring and the concimitant Iris effect of the solutions of the present invention over those of the prior art.

In that regard, we constructed two interior rearview automotive mirrors each having a cell gap of about 50 μm with ITO-coated glass substrates having about 6 to about 8 ohms per square sheet resistance.

In the first mirror, we placed an electrochemichromic solution comprising about 0.02 M of $EVClO_4$ and about 0.02 M of DMPA, both dissolved in a solvent comprising about 80% 3-ethoxypropionitrile and about 20% 2-acetylbutyrolactone (v/v). In addition, this solution contained about 5% of "UNINUL400" (w/v) as an ultraviolet stabilizing agent.

In the second mirror, we placed an electrochemichromic solution prepared according to the present invention comprising about 0.02 M of $EVCLO_4$ and about 0.02 M of reduced MVTB, both dissolved in a solvent comprisnig about 79% 3-ethoxypropionitrile, about 20% 2-acetylbutyrolactone and about 1% glacial acetic (v/v). In addition, this solution contained about 5% of "UVINUL 400" (w/v) as an ultraviolet stabilizing agent. As in Example 1, supra, prior to combining the anodic and cathodic compounds, we reacted MVTB with zinc and otherwise followed the protocol indicated.

After we prepared each mirror with the electrochemichromic solutions as described above, we introduced an applied potential of about 1.0 volt to each of the mirrors. The second mirror demonstrated an intense purple color as compared with the light green color demonstrated by the first mirror. In addition, in the bleached state, the second mirror displayed a clear yet silvery appearance while the first mirror displayed an almost clear appearance with a slightly yellow hue. Moreover, the second mirror demonstrated a fairly uniform coloring and a very small Iris effect in contrast to the non-uniform coloring and large Iris effect displayed by the first mirror.

We observed that the high reflectance was about 75.3% as compared with 79.2% for the first mirror. And, the reflectance at the center portion of the second mirror decreased from about 70% to about 20% in a response time of about 1.0 second, with an ultimate decrease to about 13.1% as compared with the first mirror which decreased from about 70% to only about 37% in about the same period of time, with an ultimate decrease to about 23.8% after about 2.9 seconds. With respect to bleaching, we observed that the second mirror and the first mirror demonstrated comparable response times in connection with their ability to bleach. That is, in the range from about 20% reflectance to about 70% reflectance, the second mirror bleached in about 0.9 seconds whereas the first mirror achieved the same results in about 1.0 second. We made and recorded these observations using the detection method described in Example 1, supra.

EXAMPLE 6

In the example, we used a combination of about 69% 3-ethoxypropionitrile, about 30% propylene carbonate and about 1% glacial acetic acid (v/v) as a solvent as yet another demonstration of the enhanced characteristics with respect to uniform coloring and the concomitant Iris effect of the solutions of the present invention over those of the prior art.

We constructed two interior rearview automotive mirrors as in Example 5, supra. In the first mirror, we placed an electrochemichromic solution comprising about 0.02 M of $EVClO_4$ and about 0.02 M of DMPA, both dissolved in a solvent comprising about 70% 3-ethoxypropionitrile and about 30% propylene carbonate.

In the second mirror, we placed an electrochemichromic solution prepared according to the present invention comprising about 0.02 M of EVClO and about 0.02 M of reduced MVTB dissolved in a solvent comprising about 9% 3-ethoxypropionitrile, about 30% propylene carbonate and about 1% glacial acetic (v/v). As in Example 1, supra prior to combining the anodic and cathodic compounds, we reacted the MVTB with zinc and otherwise followed the protocol indicated.

After we prepared each mirror with the electrochemichromic solutions as described above, we introduced an applied potential of about 1.0 volt to each of the mirrors. The second mirror demonstrated intense purple color as compared with the light green color demonstrated by the first mirror. In addition, in the bleached state, the second mirror displayed a clear yet silvery appearance while the first mirror displayed an almost clear appearance with a slight yellow hue. Moreover, the second mirror demonstrated a fairly uniform coloring and a very small Iris effect in contrast to the non-uniform coloring and large Iris effect displayed by the first mirror.

We further observed that the high reflectance at the center portion of the second mirror was about 76.5% as compared with about 78.7% for the first mirror. And, the reflectance decreased from about 70% to about 20% in a response time of about 1.0 second, with an ultimate decrease to about 13.1%, as compared with the first mirror which decreased from about 70% to only about 41% in about the same period of time, with an ultimate decrease to about 24.3% after about 2.2 seconds. We also observed that the second mirror and the first mirror demonstrated comparable response times in connection with their ability to bleach. We made and recorded these observations using the detection method described in Example 1, *supra*.

EXAMPLE 7

In order to demonstrate the enhanced intensity of the color formed by the electrochemichromic solutions of the present invention which thereby effectively decreases the reflectance percentage, we constructed two interior rearview automotive mirrors each having a cell gap of about 135 $\mu$m with ITO-coated glass substrates having about 12 to about 15 ohms per square sheet resistance.

In the first mirror, we placed an electrochemichromic solution comprising about 0.01 M of EVClO and about 0.01 M solution of DMPA, both dissolved in a solvent comprising about 80% 3-ethoxypropionitrile and about 20% 2-acetylbutyrolactone (v/v). In addition, this solution contained about 5% of "UVINUL 400" (w/v) as an ultraviolet stabilizing agent.

In the second mirror, we placed an electrochemichromic solution prepared according to the present invention comprising about 0.01 M of EVClO and about 0.01 M solution of reduced MVTB, both dissolved in a solvent comprising about 80% 3-ethoxypropionitrile and about 20% 2-acetylbutyrolactone (v/v). In addition, this solution contained about 5% of "UVINUL 400" (w/v) as an ultraviolet stabilizing agent. We dissolved the MVTB in a solvent comprising about 80% 3-ethoxypropionitrile and about 20% 2-acetylbutyrolactone (v/v), then reacted the solubilized MVTB with zinc dust and otherwise followed the protocol indicated in Example 1, supra.

After we prepared each mirror with the electrochemichromic solutions as described above, we introduced an applied potential of about 1.0 volt to each of the mirrors. The second mirror demonstrated an intense bluish purple color as compared with the light to dark green color demonstrated by the first mirror. In addition, in the bleached state, the second mirror displayed a clear yet silvery appearance while the first mirror displayed an almost clear, yet slightly yellow, non-silvery, appearance. Moreover, the second mirror demonstrated uniform coloring and no appreciable Iris effect in contrast to the non-uniform coloring with a lighter green color which formed in the center of the mirror and a small Iris effect displayed by the first mirror.

We further observed that the high reflectance at the center portion of the second mirror was about 73.5% as compared with about 80.2% for the first mirror. And, the reflectance decreased from about 70% to about 20% in a response time of about 1.4 seconds, with an ultimate decrease to about 10.2%, as compared with the first mirror which decreased from about 70% to only about 40% in about the same period of time, with an ultimate decrease to about 20.2%. We made and recorded these observations using the detection method described in Example 1, *supra*.

EXAMPLE 8

In Examples 8 and 9, we used combinations of 3-hydroxypropionitrile and glutaronitrile in the solvent to still further demonstrate the benefits of the solutions of the present invention.

We constructed two interior rearview automotive mirrors each having a cell gap of about 100 $\mu$m with ITO-coated glass substrates having about 12 to about 15 ohms per square sheet resistance.

In the first mirror, we placed an electrochemichromic solution comprising about 0.035 M of EVClO$_4$ and about 0.035 M of DMPA, both dissolved in a solvent comprising about 75% 3-hydroxypropionitrile combined with about 25% glutaronitrile (v/v). In addition, we placed about 5% of "UVINUL 400" (w/v) in this solution.

In the second mirror, we placed an electrochemichromic solution comprising about 0.0175 M of EVClO$_4$ and about 0.0175 M of reduced MVTB, both dissolved in a solvent comprising about 74% 3-hydroxypropionitrile, about 25% glutaronitrile and about 1% glacial acetic acid (v/v). In addition, we placed about 5% of "UVINUL 400" (w/v) in this solution. As in Example 1, supra prior to combining the anodic and cathodic compounds, we reacted MVTB with zinc and otherwise followed the protocol indicated.

We then introduced an applied potential of about 1.0 volt to each of the mirrors, and thereafter observed that the second mirror, filled with an electrochemichromic solution of the present invention, colored rapidly with excellent uniformity and without an appreciable Iris effect as compared with the first mirror. We observed an intense bluish purple color as compared with the largely dark green color demonstrated by the first mirror.

In addition, we observed that the high reflectance at the center portion of the second mirror was about 79.5% as compared with 74.7% in the first mirror. And, the reflectance decreased from about 70% to about 20% in a response time of about 1.7 seconds, with an ultimate decrease to about 8.6%, while the first mirror decreased from about 70% to only about 37% in about the same period of time, with an ultimate decrease to about 13.7% after about 5.3 seconds. We also observed that the second mirror bleached from about 20% reflectance to about 60% reflectance in a response time of about 1.9 seconds as compared with the first mirror which bleached to about the same degree in about 2.2 seconds. When in the bleached state, the second mirror displayed a clear and silvery appearance while the first mirror displayed a clear appearance with a slight yellow hue.

The numerical values obtained in connection with these observations were made using the detection method described in Example 1, supra.

EXAMPLE 9

In this example, we used a combination of about 49.5% 3-hydroxypropionitrile, about 49.5% glutaronitrile and about 1% glacial acetic acid (v/v) to construct an interior rearview automotive mirror having a cell gap of about 100 μm with ITO-coated glass substrates having about 12 to about 15 ohms per square sheet resistance.

We constructed this mirror with an electrochemichromic solution comprising about 0.02M of $EVClO_4$ and about 0.02M of reduced MVTB, both dissolved in a solvent comprising about 49.5% 3-hydroxypropionitrile, about 49.5% glutaronitrile and about 1% glacial acetic acid (v/v) placed between the substrates. In addition, we placed about 5% of "UVINUL 400" (w/v) to this solution. As in Example 1, supra, prior to combining the anodic and cathodic compounds, we reacted MVTB with zinc and otherwise followed the protocol indicated.

We then introduced an applied potential of about 1.0 volt to the mirror, and thereafter observed that the mirror colored rapidly with excellent uniformity and without an appreciable Iris effect. We thereafter observed the formation of an intense bluish purple color.

In addition, we observed that the high reflectance at the center portion of the mirror was about 74.3%. And, the reflectance decreased from about 70% to about 20% in a response time of about 1.5 seconds, with an ultimate decrease to about 7.7%. We also observed that the mirror bleached from about 10% reflectance to about 60% reflectance in a response time of about 4.7 seconds. When in the bleached state, the mirror displayed a clear appearance.

The numerical values obtained in connection with these observations were made using the detection method described in Example 1, supra.

EXAMPLE 10

In this example, we used the combination of about 69% 3-hydroxypropionitrile, about 30% 3,3'-oxydipropionitrile and about 1% glacial acetic acid (v/v) as a solvent in connection with the construction of an electrochemichromic interior rearview automotive mirror. This mirror was constructed from ITO-coated glass substrates having a cell gap of about 100 μm with about 12 to about 15 ohms per square sheet resistance.

We placed an electrochemichromic solution comprising about 0.02M of EVClO and about 0.02M of reduced MVTB, both dissolved in a solvent comprising about 69% 3-oxydipropionitrile about 30% 3,3'-ocydipropionitrile and about 1% glacial acetic acid (v/v). In addition, we placed about 5% of "UVINUL 400" (w/v) to this solution. As in Example 1, supra, prior to combining the anodic and cathodic compounds, we reacted MVTB with zinc and otherwise followed the protocol indicated.

We then introduced an applied potential of about 1.0 volt to the mirror, and thereafter observed that the mirror colored rapidly with excellent uniformity and without an appreciable Iris effect. We thereafter observed the formation of an intense bluish purple color.

In addition, we observed that the high reflectance at the center portion of the mirror was about 73.2%. And, the reflectance decreased from about 70% to about 20% in a response time of about 1.5 seconds, with an ultimate decrease to about 6.9%. What's more, we observed that the mirror bleached from about 10% reflectance to about 60% reflectance in a response time of about 4.7 seconds. When in the bleached state, the mirror displayed a clear and silvery appearance.

The numerical values obtained in connection with these observations were made using the detection method described in Example 1, supra.

EXAMPLE 11

In this example, we used the combination of about 69% 3-ethoxypropionitrile, about 30% 3-hydroxypropionitrile and about 1% glacial acetic acid (v/v) as a solvent in connection with the construction of an electrochemichromic interior rearview automotive mirror. This mirror was constructed from ITO-coated glass substrates having a cell gap of about 100 μm with about 12 to about 15 ohms per square sheet resistance.

We placed an electrochemichromic solution comprising about 0.02M of EVClO and about 0.02M of reduced MVTB, both dissolved in a solvent comprising about 69% ethoxypropionitrile, about 30% 3-hydroxypropionitrile and about 1% glacial acetic acid (v/v). In addition, we placed about 5% of "UVINUL 400" (w/v) to this solution. As in Example 1, supra, prior to combining the anodic and cathodic compounds, we reacted MVTB with zinc and otherwise followed the protocol indicated.

We then introduced an applied potential of about 1.0 volt to the mirror, and thereafter observed that the mirror colored rapidly with excellent uniformity and without an appreciable Iris effect. We thereafter observed the formation an intense bluish purple color.

In addition, we observed that the high reflectance at the center portion of the mirror was about 72.4%. And, the reflectance decreased from about 70% to about 20% in a response time of about 1.7 seconds, with an ultimate decrease to about 9.4%. Moreover, we observed that the mirror bleached from about 10% reflectance to about 60% reflectance in a response time of about 3.2 seconds. When in the bleached state, the mirror displayed a clear appearance.

The numerical values obtained in connection with these observations were made using the detection method described in Example 1, supra.

EXAMPLE 12

In this example, we used the combination of about 99% propylene carbonate and about 1% glacial acetic acid (v/v) as a solvent in connection with the construction of an electrochemichromic interior rearview automotive mirror. This mirror was constructed from ITO-coated glass substrates having a cell gap of about 50 μm with about 6 to about 8 ohms per square sheet resistance.

We placed an electrochemichromic solution comprising about 0.025M of $EVClO_4$ and about 0.025M of reduced MVTB, both dissolved in a solvent comprising about 99% propylene carbonate and about 1% glacial acetic acid (v/v). In addition, we placed about 5% of "UVINUL 400" (w/v) to this solution. As in Example 1, supra, prior to combining the anodic and cathodic compounds, we reacted MVTB with zinc and otherwise followed the protocol indicated.

We then introduced an applied potential of about 1.0 volt to the mirror, and thereafter observed that the mirror colored rapidly with excellent uniformity and without an appreciable Iris effect. We thereafter observed the formation of an intense bluish purple color.

In addition, we observed that the high reflectance at the center portion of the mirror was about 76.3%. And, the reflectance decreased from about 70% to about 20% in a response time of about 1.1 seconds, with an ultimate decrease to about 14.5%. What's more, we observed that the mirror bleached from low reflectance to about 60% reflectance in a response time of about 0.7 seconds. When in the bleached state, the mirror displayed a clear and silvery appearance.

The numerical values obtained in connection with these observations were made using the detection method described in Example 1, supra.

EXAMPLE 13

A window assembly or a sun roof assembly may also be constructed using the electrochemichromic solutions of the present invention. To that end, we constructed a sun roof assembly employing the subject solutions.

We constructed an automotive sun roof from tin oxidecoated glass having about 10 ohms per square sheet resistance [commercially available as TEC-Glass products from Libbey-Owens-Ford Co., LOF Glass Division, Toledo, Oh.]. The dimensions of the sun roof were approximately 38 cm×60 cm, with a cell gap of about 380 μm between the two tin oxide-coated glass substrates. The integrity of this cell gap was kept intact by a sealing means constructed of plasticized polyvinyl butyral which also ensured that the electrochemichromic solution remained therein.

We prepared an electrochemichromic solution according to the present invention whose constituents included about 0.01M of MVTB, that was previously reacted with zinc as in Example 1, supra, about 0.015M of $EVClO_4$, about 0.05M of tetraethylammonium perchlorate and about 5% of "UVINUL 400" (w/v). We prepared solutions of these constituents with a solvent comprising about 64% propylene carbonate, about 35% cyanoethyl sucrose and about 1% acetic acid (v/v).

After filling the cell in the sun roof with this solution, we introduced an applied potential of about 1.0 volt thereto and observed over a time period of about 2 minutes a change from about 74.5% to about 17% in the amount of light transmitted through the sun roof. When we applied zero potential, the electrochemichromic solution self-erased such that the amount of light transmitted therethrough was first observed at about 5% and then over a period of about 2 minutes the color lessened to the point that about 25% of the light was being transmitted through the solution. After a period of about 7 minutes, this solution completely self-erased. We made and recorded these observations using the detection method described in Example 1, supra, except that the reflectometer was set in transmission mode.

In general, we observed good cycle stability, heat stability and ultraviolet stability of the solutions of the present invention when contained within the devices described herein. Specifically, when MVTB is employed in conjunction with $EVClO_4$ in any of the solvents herein recited, a solution of even more ultraviolet stability is observed when compared with the combination of DMPA and $EVClO_4$ in that same solvent. We also observed greater rapidity of response times, especially when bleaching, with solutions having 3-ethoxypropionitrile as a solvent component.

While we have provided the above examples for illustrative purposes employing preferred electrochemichromic compounds and solvents, it is to be understood that each of the electrochemichromic compounds and solvents identified herein will provide suitable, if not comparable, results when viewed in connection with the results gleaned from these examples.

Although we have described the foregoing invention in some detail by way of illustration and example, it will be clear to one of ordinary skill in the art that changes and modifications may be practiced within the spirit of the claims which define the scope of the present invention. Thus, the art-skilled will recognize or readily ascertain using no more than routine experimentation, that equivalents exist to the embodiments of the invention described herein. And, it is intended that such equivalents be encompassed by the claims which follow hereinafter.

What we claim is:

1. An electrochemichromic solution capable of color change when an applied potential is introduced thereto, said electrochemichromic solution comprising:
   (a) at least one anodic compound, said anodic compound having been previously contacted with a redox agent such that said anodic compound exists in a different valence state than prior to having been contacted with said redox agent;
   (b) at least one cathodic compound; and
   (c) a solvent
   wherein the redox potential of said anodic compound in said different valence state is greater than the redox potential of said cathodic compound while each is contacted with said solvent.

2. The electrochemichromic solution according to claim 1, wherein said anodic compound is represented by the formula below:

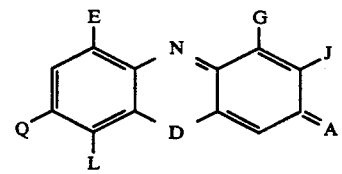

wherein
   A is O, $NRR_1$;
      wherein R and R may be the same or different and each may be selected from the group consisting of H or any straight-chain or branched alkyl constituent having from about one carbon atom to about six carbon atoms, provided that when A is $NRR_1$, Q is H or OH;
   D is O, S;
   E is R, COOH, $CONH_2$, phenyl, 2,4-dihydroxyphenyl;
   G is H;
   J is phenyl, 2,4-dihydroxyphenyl; or G and J, when taken together, represent an aromatic ring structure having six carbon ring atoms when viewed in conjunction with the ring carbon atoms to which they are attached;

L is H, OH; and
Q is H, OH, NRR₁.

3. The electrochemichromic solution according to claim 2, wherein each A of said anodic compound is NRR₁, a salt selected from the group consisting of tetrafluoroborate, perchlorate, trifluoromethane sulfonate, hexafluorophosphate and any halogen is associated therewith.

4. The electrochemical solution according to claim 2, wherein when Q of said anodic compound is OH, a salt selected from the group consisting of any alkali metal is associated therewith.

5. The electrochemichromic solution according to claim 2, wherein said anodic compound is a member selected from the class of chemical compounds consisting of the following formulae:

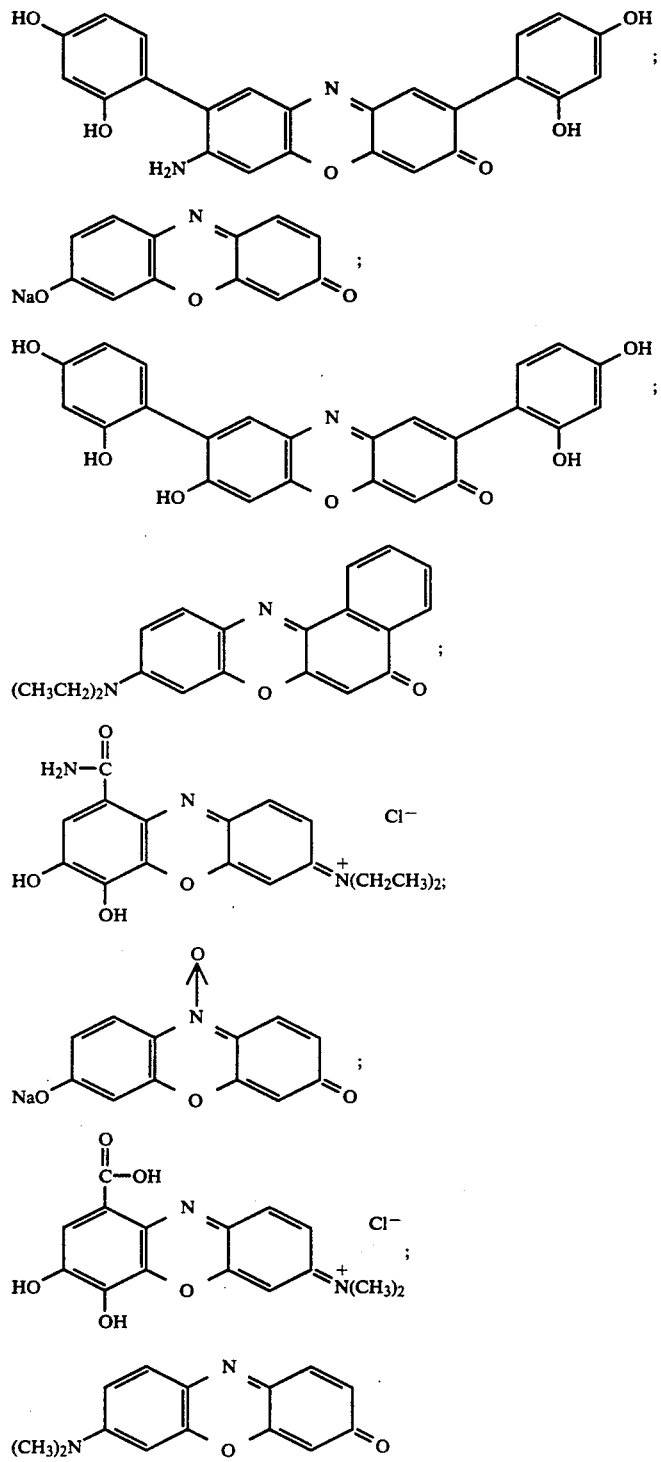

and any combination thereof.

6. The electrochemichromic solution according to claim 2, wherein said anodic compound is represented by the formula below:

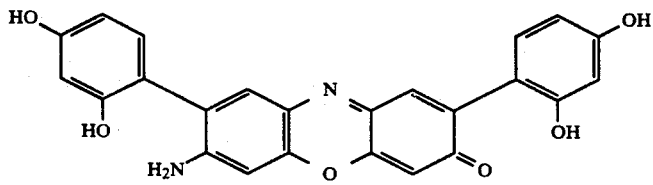

7. The electrochemichromic solution according to claim 2, wherein said anodic compound is represented by the formula below:

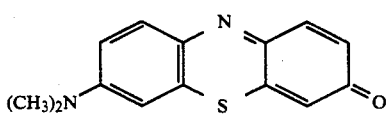

8. The electrochemichromic solution according to claim 2, wherein said anodic compound is represented by the formula below:

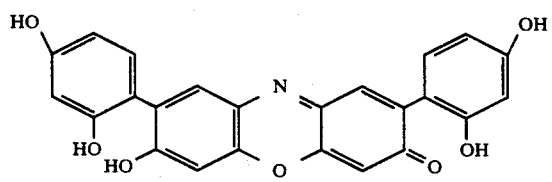

9. The electrochemichromic solution according to claim 2, wherein said anodic compound is represented by the formula below:

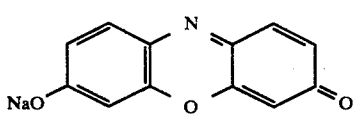

10. The electrochemichromic solution according to claim 2, wherein said anodic compound is represented by the formula below:

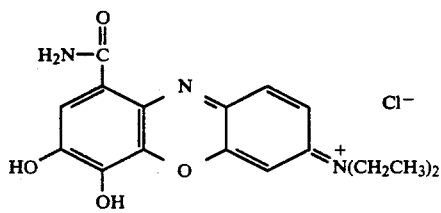

11. The electrochemichromic solution according to claim 2, wherein said anodic compound is represented by the formula below:

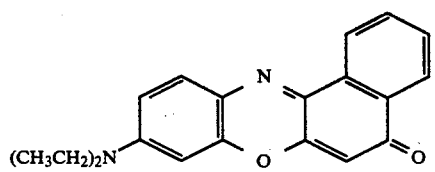

12. The electrochemichromic solution according to claim 2, wherein said anodic compound is represented by the formula below:

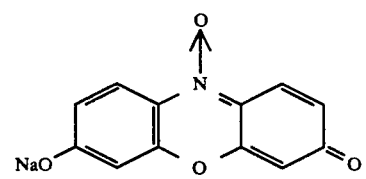

13. The electrochemichromic solution according to claim 2, wherein said anodic compound is represented by the formula below:

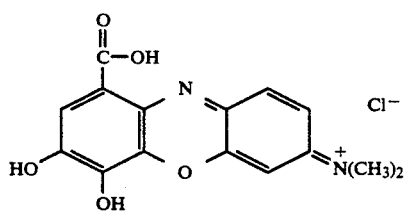

14. The electrochemichromic solution according to claim 1, wherein said cathodic compound is selected from the group of chemical compounds consisting of the following formulae:

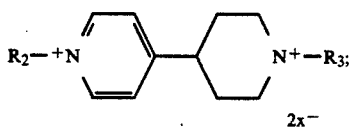

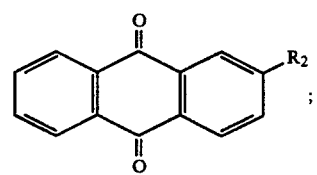

-continued

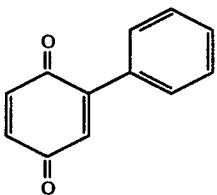

wherein
R$_2$ and R$_3$ may be the same or different and each may be selected from the group consisting of H or any straight-chain or branched alkyl constituent having from about one carbon atom to about six carbon atoms;
X is selected from the group consisting of tetrafluoroborate, perchlorate, trifluoromethane sulfonate, hexafluorophosphate, any halogen
and any combination thereof.

15. The electrochemichromic solution according to claim 14, wherein said cathodic compound is

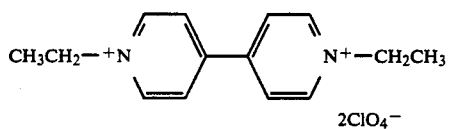

16. The electrochemichromic solution according to claim 14, wherein said cathodic compound is

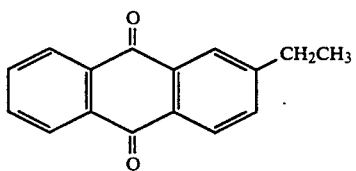

17. The electrochemichromic solution according to claim 14, wherein said cathodic compound is

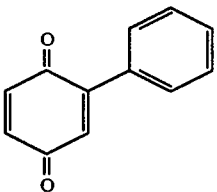

18. The electrochemichromic solution according to claim 1, wherein said redox agent of (a) is in a solid form.

19. The electrochemichromic solution according to claim 18, wherein said redox agent has a particle size of about 50 mesh to about 400 mesh.

20. The electrochemichromic solution according to claim 1, wherein said redox agent of (a) is a reducing agent capable of causing an electrochemichromic compound to assume a decreased valence state upon contacting therewith as compared with that valence state possessed by said electrochemichromic compound prior to having been contacted with said reducing agent.

21. The electrochemichromic solution according to claim 20, wherein said reducing agent is a member selected from the group consisting of zinc, ascorbic acid, sodium hydrosulfite, vanadium (III) chloride, chromium (II) acetate, sulfur dioxide and any combination thereof.

22. The electrochemichromic solution according to claim 21, wherein said reducing agent is zinc.

23. The electrochemichromic solution according to claim 1, wherein said redox agent of (a) is an oxidizing agent capable of causing an electrochemichromic compound to assume an increased valence state upon contacting therewith as compared with that valence state possessed by said electrochemichromic compound prior to having been contacted with said oxidizing agent.

24. The electrochemichromic solution according to claim 23, wherein said oxidizing agent is a member selected from the group consisting of air, oxygen, sodium persulfate, methylene violet (Bernthsen) and any combination thereof.

25. The electrochemichromic solution according to claim 1, wherein said solvent of (c) is a member selected from the group consisting of acetonitrile, 3-hydroxypropionitrile, methoxypropionitrile, 3-ethoxypropionitrile, propylene carbonate, 2-acetylbutyrolactone, cyanoethyl sucrose, 7-butyrolactone, 2-methylglutaronitrile, N,N'-dimethylformamide, 3,3'-ethylsulfolane, methylethyl ketone, cyclopentanone, cyclohexanone, benzoyl acetone, 4-hydroxy-4-methyl-2-pentanone, acetophenone, glutaronitrile, 3,3'-oxydipropionitrile, 2-methoxyethyl ether, triethylene glycol dimethyl ether and any combination thereof.

26. The electrochemichromic solution according to claim 1, wherein said solvent of (c) is acidic.

27. The electrochemichromic solution according to claim 26, wherein said solvent is rendered acidic by employing as a solvent component an acidic material selected from the group consisting of acetic acid, any hydrogen halide gas in solution, perchloric acid, 2-acetylbutyrolactone, 3-hydroxypropionitrile and any combination thereof.

28. The electrochemichromic solution according to claim 27, wherein said solvent component is acetic acid.

29. The electrochemichromic solution according to claim 28, wherein said solvent component is acetic acid employed in the range of about 0.01% (v/v) to about 75% (v/v).

30. The electrochemichromic solution according to claim 28, wherein said solvent component is acetic acid employed at about 1% (v/v).

31. The electrochemichromic solution according to claim 26, wherein said solvent is comprised of about 74% 3-hydroxypropionitrile, about 25% glutaronitrile and about 1% acetic acid (v/v).

32. The electrochemichromic solution according to claim 26, wherein said solvent is comprised of about 49.5% 3-hydroxypropionitrile, about 49.5% glutaronitrile and about 1% acetic acid (v/v).

33. The electrochemichromic solution according to claim 26, wherein said solvent is comprised of about 64% propylene carbonate, about 35% cyanoethyl sucrose and about 1% acetic acid (v/v).

34. The electrochemichromic solution according to claim 26, wherein said solvent is comprised of about 69% 3-hydroxypropionitrite, 30% 3,3'-oxydipropionitrile and about 1% acetic acid (v/v).

35. The electrochemichromic solution according to claim 26, wherein said solvent is comprised of about 99% propylene carbonate and about 1% acetic acid (v/v).

36. The electrochemichromic solution according to claim 1, further comprising (d) a constituent selected from the group consisting of an ultraviolet stabilizing agent, an electrolytic material and any combination thereof.

37. The electrochemichromic solution according to claim 36, wherein said ultraviolet stabilizing agent is a member selected from the group consisting of "UVINUL 400", "UVINUL D-49", TINUVIN P, "TINUVIN 327", "TINUVIN 328", "Cyasorb 24", benzotriazole, benzophenone and any combination thereof.

38. The electrochemichromic solution according to claim 37, wherein said ultraviolet stabilizing agent is "UVINUL 400".

39. The electrochemichromic solution according to claim 36, wherein said electrolytic material is a member selected from the group consisting of tetrabutylammonium hexafluorophosphate, tetraethylammonium perchlorate, tetrabutylammonium tetrafluoroborate, tetrabutylammonium trifluoromethane sulfonate, any halogen alkali metal salt and any combination thereof.

40. The electrochemichromic solution according to claim 39, wherein said electrolytic material is tetrabutylammonium hexafluorophosphate.

41. The electrochemichromic solution according to claim 1, wherein the total concentration of said first electrochemichromic compound and said second electrochemichromic compound in said electrochemichromic solution is in the range of about 0.001M to about 0.1M.

42. The electrochemichromic solution according to claim 41, wherein the total concentration of said first electrochemichromic compound and said second electrochemichromic compound in said electrochemichromic solution is about 0.04M.

43. The electrochemichromic solution according to claim 1, wherein said applied potential is introduced to said solution in the range of about 0.001 volts to about 5 volts.

44. The electrochemichromic solution according to claim 43, wherein said applied potential is introduced at about 1 volt.

45. A process for preparing an electrochemichromic solution, said process comprises:
(a) solubilizing an electrochemichromic compound with a solvent;
(b) contacting said solubilized electrochemichromic compound with a redox agent to alter the valence state of said electrochemichromic compound such that an anodic compound is created in solution which has a different valence state than said solubilized electrochemichromic compound possessed prior to having been contacted with said redox agent;
(c) contacting a cathodic compound with said solubilized anodic compound of (b) to form said electrochemichromic solution; and
(d) introducing an applied potential to said electrochemichromic solution such that a current passes through said electrochemichromic solution thereby causing a color change thereof.

46. The process according to claim 45, wherein said anodic compound is represented by the formula below:

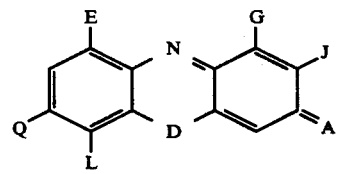

wherein
A is O, NRR$_1$;
  wherein R and R$_1$ may be the same or different and each may be selected from the group consisting of H, any straight-chain or branched alkyl constituent having from about one carbon atom to about six carbon atoms, provided that when A is NRR$_1$, Q is H or OH;
D is O, S;
E is R$_1$, COOH, CONH$_2$, phenyl, 2,4-dihydroxyphenyl;
G is H;
J is phenyl, 2,4-dihydroxyphenyl; or G and J, when taken together, represent an aromatic ring structure having six carbon ring atoms when viewed in conjunction with the ring carbon atoms to which they are attached;
L is H, OH; and
Q is OH, NRR$_1$.

47. The process according to claim 46, wherein when A of said anodic compound is NRR$_1$, a salt selected from the group consisting of tetrafluoroborate, perchlorate, trifluoromethane sulfonate, hexafluorophosphate and any halogen is associated therewith.

48. The process according to claim 46, wherein when Q of said anodic compound is OH, a salt selected from the group consisting of any alkali metal is associated therewith.

49. The process according to claim 46, wherein said anodic compound is selected from the group consisting of the chemical compounds represented by the following formulae

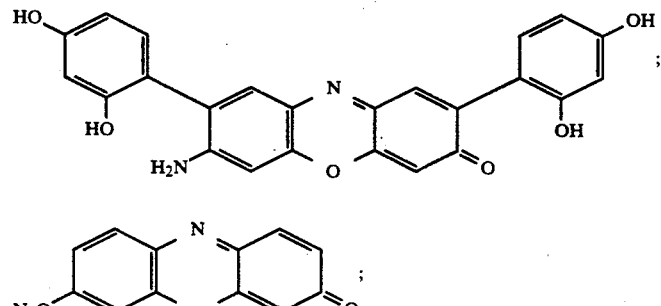

-continued

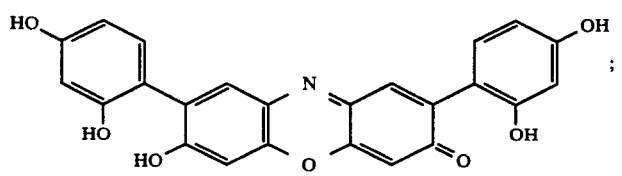

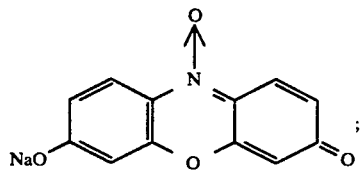

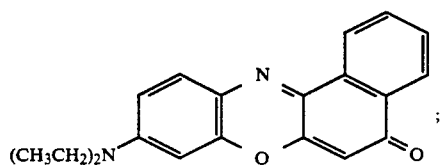

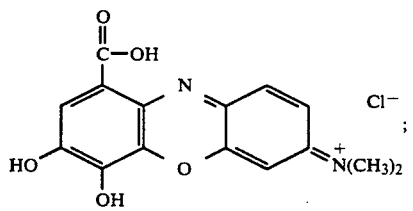

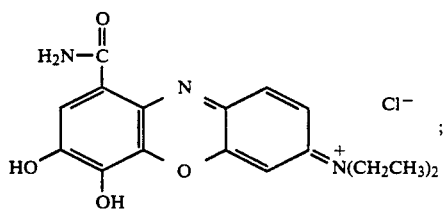

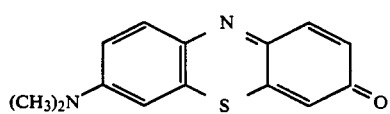

and any combination thereof.

50. The process according to claim 46, wherein said anodic compound is represented by the formula below:

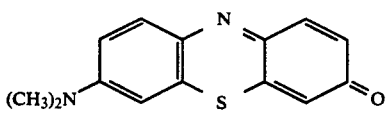

51. The process according to claim 46, wherein said anodic compound is represented by the formula below:

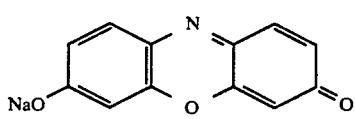

52. The process according to claim 46, wherein said anodic compound is represented by the formula below:

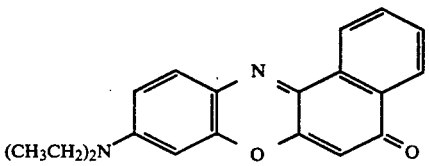

53. The process according to claim 46, wherein said anodic compound is represented by the formula below:

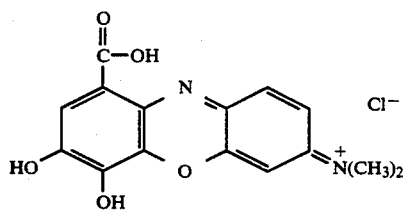

54. The process according to claim 46, wherein said anodic compound is represented by the formula below:

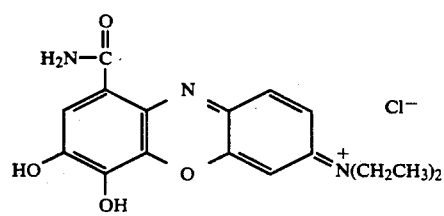

55. The process according to claim 46, wherein said anodic compound is represented by the formula below:

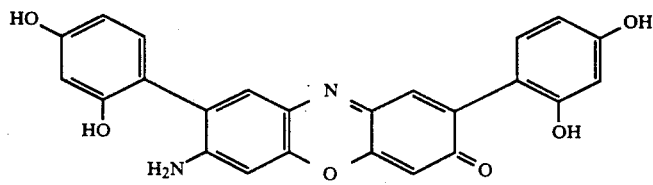

56. The process according to claim 46, wherein said anodic compound is represented by the formula below:

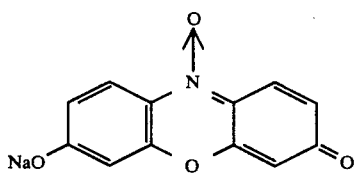

57. The process according to claim 46, wherein said anodic compound is represented by the formula below:

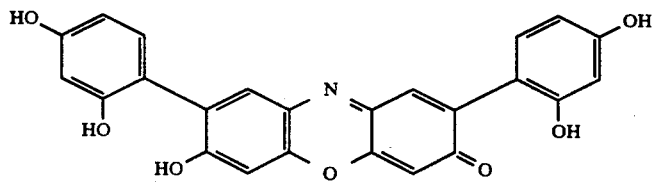

58. The process according to claim 45, wherein said cathodic compound is selected from the group consisting of the chemical compounds presented by the following formulae:

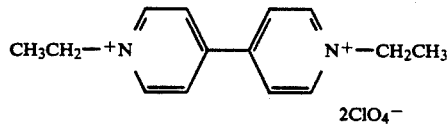

wherein
$R_2$ and $R_3$ may be the same or different and each may be selected from the group consisting of H or any straight-chain or branched alkyl constituent having from about one carbon atom to about six carbon atoms; and
X is selected from the group consisting of tetrafluoroborate, perchlorate, trifluoromethane sulfonate, hexafluorophosphate, any halogen and any combination thereof.

59. The process according to claim 58, wherein said cathodic compound is represented by the formula below:

$$CH_3CH_2-{}^+N \quad \quad N^+-CH_2CH_3$$

$$2ClO_4^-$$

60. The process according to claim 58, wherein said cathodic compound is represented by the formula below:

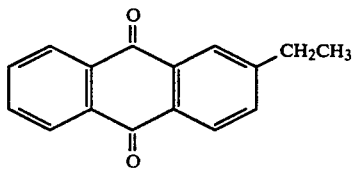

61. The process according to claim 58, wherein said cathodic compound is represented by the formula below:

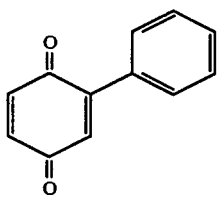

62. The process according to claim 45, further comprising after (b) removing that quantity of said redox agent of (b) which has remained unreacted.

63. The process according to claim 62, wherein said redox agent is removed by a means selected from the group consisting of filtering, decanting, osmosis, fractionating, precipitating, extracting, centrifuging, vacuum and any combination thereof.

64. The process according to claim 45, wherein said redox agent of (b) is in a solid form.

65. The process according to claim 64, wherein said redox agent has a particle size of about 50 mesh to about 400 mesh.

66. The process according to claim 45, wherein said redox agent of (b) is a reducing agent capable of causing an electrochemichromic compound to assume a decreased valence state upon contacting therewith as compared with that valence state possessed by said electrochemichromic compound prior to having been contacted with said reducing agent.

67. The process according to claim 66, wherein said reducing agent is a member selected from the group consisting of zinc, ascorbic acid, sodium hydrosulfite, vanadium (III) chloride, chromium (II) acetate, sulfur dioxide and any combination thereof.

68. The process according to claim 67, wherein said reducing agent is zinc.

69. The process according to claim 45, wherein said redox agent of (b) is an oxidizing agent capable of causing an electrochemichromic compound to assume an increased valence state upon contacting therewith as compared with that valence state possessed by said electrochemichromic compound prior to having been contacted with said oxidizing agent.

70. The process according to claim 69, wherein said oxidizing agent is a member selected from the group consisting of air, oxygen, sodium persulfate, methylene violet (Bernthsen) and any combination thereof.

71. The process according to claim 45, wherein said electrochemichromic solution further comprises a constituent selected from the group consisting of an ultraviolet stabilizing agent, an electrolytic material and any combination thereof.

72. The process according to claim 71, wherein said constituent is an ultraviolet stabilizing agent.

73. The process according to claim 72, wherein said ultraviolet stabilizing agent is selected from the group consisting of "UVINUL 400", "UVINUL D-49", "TINUVIN P", "TINUVIN 327", "TINUVIN 328", "Cyasorb 24", benzotriazole, benzophenone and any combination thereof.

74. The process according to claim 73, wherein said ultraviolet stabilizing agent is "UVINUL 400".

75. The process according to claim 71, wherein said constituent is an electrolytic material.

76. The process according to claim 75, wherein said electrolytic material is selected from the group consisting of tetrabutylammonium hexafluorophosphate, tetraethylammonium perchlorate, tetrabutylammonium tetrafluoroborate, tetrabutylammonium trifluoromethane sulfonate, any halogen alkali metal salt and any combination thereof.

77. The process according to claim 76, wherein said electrolytic material is tetrabutylammonium hexafluorophosphate.

78. The process according to claim 45, wherein said solvent of (a) is a member selected from the group consisting of acetonitrile, 3-hydroxypropionitrile, methoxypropionitrile, 3-ethoxypropionitrile, propylene carbonate, 2-acetylbutyrolactone, cyanoethyl sucrose, γ-butyrolactone, 2-methylglutaronitrile, N,N'-dimethylformamide, 3-methylsulfolane, methylethyl ketone, cyclopentanone, cyclohexanone, benzoyl acetone, 4-hydroxy-4-methyl-2-pentanone, acetophenone, glutaronitrile, 3,3'-oxydipropionitrile, 2-methoxyethyl ether, triethylene glycol dimethyl ether and any combination thereof.

79. The process according to claim 45, wherein said solvent of (a) is acidic.

80. The process according to claim 79, wherein said solvent is rendered acidic by employing as a solvent component an acidic material selected from the group consisting of acetic acid, any hydrogen halide gas in solution, perchloric acid, 2-acetylbutyrolactone, 3-hydroxypropionitrile and any combination thereof.

81. The process according to claim 80, wherein said solvent component is acetic acid.

82. The process according to claim 81, wherein said solvent component is acetic acid employed in the range of about 0.01% (v/v) to about 75% (v/v).

83. The process according to claim 82, wherein said solvent component is employed at about 1% (v/v).

84. The process according to claim 80, wherein said solvent is comprised of about 74% 3-hydroxypropionitrile, about 24% glutaronitrile and about 1% acetic acid (v/v).

85. The process according to claim 80, wherein said solvent is comprised of about 49.5% 3-hydroxypropionitrile, about 49.5% glutaronitrile and about 1% acetic acid (v/v).

86. The process according to claim 80, wherein said solvent is comprised of about 64% propylene carbonate, about 35% cyanoethyl sucrose (v/v) and about 1% acetic acid (v/v).

87. The process according to claim 80, wherein said solvent is comprised of about 69% 2-hydroxypropionitrile, about 30% 3,3'-oxydipropionitrile and about 1% acetic acid (v/v).

88. The process according to claim 80, wherein said solvent is comprised of about 99% propylene carbonate and about 1% acetic acid (v/v).

89. A process for using an electrochemichromic solution according to claim 1, said process comprises:

(a) inserting said electrochemichromic solution into a cell;

sealing said cell so that said electrochemichromic solution is prevented from escaping therefrom; and (c) introducing an applied potential to said electrochemichromic solution contained in said cell such that a current passes therethrough to cause a color change thereof.

90. An electrochemichromic device comprising:

(a) a first substantially transparent substrate coated with a substantially transparent conductive coating on its interior face;

(b) a second substantially transparent substrate coated with a substantially transparent conductive coating on its interior face, said second substrate positioned in substantially parallel spaced-apart relationship with said first substrate and being laterally displaced therefrom;

(c) a sealing means positioned toward the peripheral edge of each of said first substrate and said second substrate and sealingly forming a cell cavity therebetween;

(d) the electrochemichromic solution according to claim 1 having been dispensed into and confined within said cell cavity; and (e) a means for introducing an applied potential to said electrochemichromic solution to controllably cause a variation in the amount of light transmitted through said device.

91. The electrochemichromic device according to claim 90, wherein said transparent conductive coating may be constructed from a material selected from the group consisting of indium tin oxide, tin oxide, antimony-doped tin oxide, fluorine-doped tin oxide, antimony-doped zinc oxide and aluminum-doped zinc oxide.

92. The electrochemichromic device according to claim 90, wherein said device is a member selected from the group consisting of mirrors, glazings, partitions, filters, displays and lenses.

93. The electrochemichromic device according to claim 92, wherein said glazing is a window assembly.

94. The electrochemichromic device according to claim 92, wherein said glazing is a sun roof assembly.

95. The electrochemichromic device according to claim 92, wherein said device is a mirror assembly further comprising a reflective coating on a face of either one of said first substrate or said second substrate.

96. The electrochemichromic mirror assembly according to claim 95, wherein said reflective coating is constructed of a material selected from the group consisting of aluminum, silver, platinum, palladium, titanium, chromium and stainless steel.

97. The electrochemichromic device according to claim 90, wherein said first substrate of (a) is a laminate assembly comprising at least two substantially transparent panels affixed to one another by a substantially transparent adhesive layer.

98. The electrochemichromic device according to claim 90, further comprising (g) a molded casing formed about the periphery of said device.

99. The electrochemichromic device according to claim 98, wherein said molded casing is constructed of injection molded polyvinyl chloride.

100. The electrochemichromic device according to claim 98, wherein said molded casing is constructed of a moldable material that is reaction injected molded.

101. The electrochemichromic device according to claim 90, wherein said sealing means of (c) may be constructed from a member selected from the group consisting of thermosetting materials and thermoplastic materials.

102. The electrochemichromic device according to claim 101, wherein said sealing means is constructed from a thermosetting material.

103. The electrochemichromic device according to claim 101, wherein said sealing means is constructed of a thermoplastic material.

104. The electrochemichromic device according to claim 90, wherein said first substrate of (a) and said second substrate of (b) are constructed from a material selected from the group consisting of glass, optical plastics, laminated glass and tempered glass.

105. The electrochemichromic device according to claim 90, wherein said first substrate of (a) and said second substrate of (b) are each constructed of the same material.

106. The electrochemichromic device according to claim 90, wherein said first substrate of (a) and second substrate of (b) are each constructed of different materials.

107. An electrochemichromic device comprising:

(a) a first glass substrate coated with a conductive coating on its interior face;

(b) a second glass substrate coated with a conductive coating on its interior face, said second glass substrate positioned in substantially parallel spaced-apart relationship with said first glass substrate;

(c) a sealing means positioned toward, but inward from, the peripheral edge of each of said first substrate and said second substrate and sealingly forming a cell cavity therebetween;

(d) an electrochemichromic solution capable of color change when an applied potential is introduced thereto, said electrochemichromic solution comprising:

(1) methylene violet (Bernthsen), wherein said methylene violet (Bernthsen) has previously been reduced;

(2) an alkyl-substituted viologen salt, wherein said alkyl substituent is a member-selected from the group consisting of any straight-chain or branched alkyl group having from about one carbon atom to about six carbon atoms; and (3) a solvent, wherein said solvent is a member selected from the group consisting of the the combination of 3-hydroxypropionitrile, glutaronitrile and acetic acid, the combination of propylene carbonate and acetic acid, the combination of 3-ethoxypropionitrile and 2-acetylbutyrolactone, the combination of 3-ethoxypropionitrile, glutaronitrile and acetic acid, the combination of 3-hydroxypropionitrile, 3,3'-oxydipropionitrile and acetic acid, and the combination of propylene carbonate, cyanoethyl sucrose and acetic acid, wherein said solution has been dispensed into and confined within said cell cavity; and (e) a means for introducing an applied potential to said electrochemichromic solution to controllably cause a variation in the amount of light transmitted through said solution.

108. The electrochemichromic device according to claim 107, wherein said device is selected from the group consisting of mirrors, glazings, partitions, filters, displays and lenses.

109. The electrochemichromic device according to claim 108, wherein said device is a mirror further comprising a reflective coating on a face of said second glass substrate.

110. The process for using an electrochemichromic solution according to claim 89, wherein said anodic compound of said electrochemichromic solution is a member selected from the group consisting of chemical compounds of the following formulae:

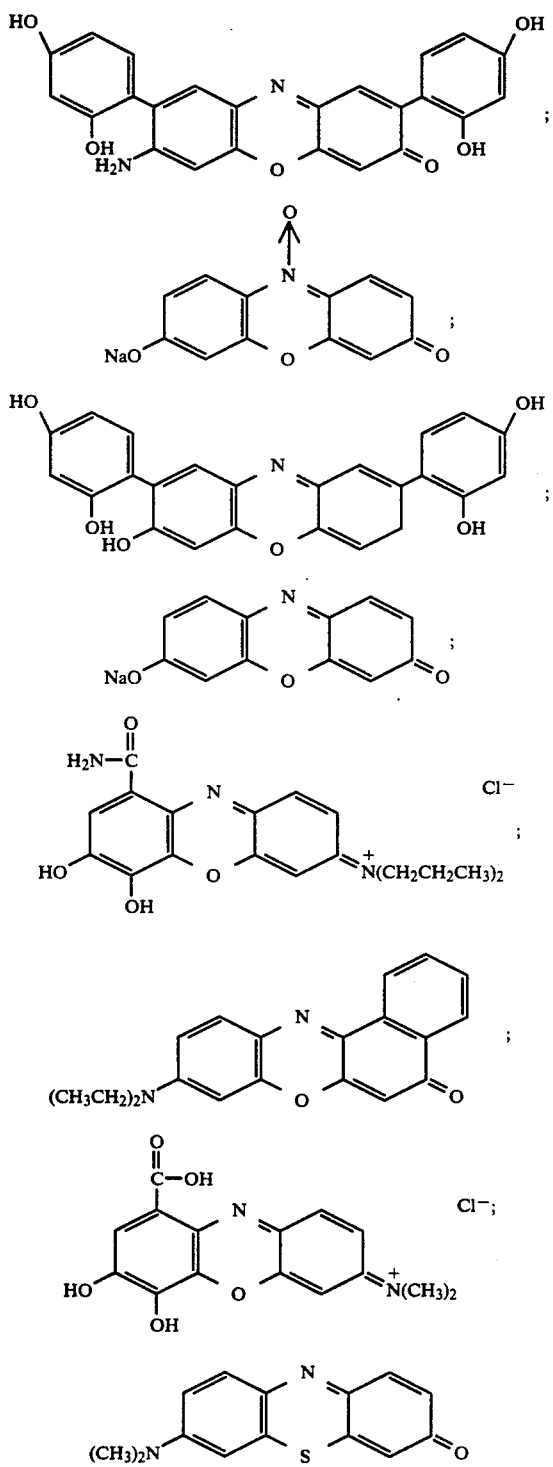

and any combination thereof.

111. The process for using an electrochemichromic solution according to claim 89, wherein said anodic compound of said electrochemichromic solution is 112. The process for using an electrochemichromic solution according to claim 89, wherein said cathodic compound of said electrochemichromic solution is a member selected from the group consisting of chemical compounds of the following formulae:

wherein $R_2$ and $R_3$ may be the same or different and each may be selected from the group consisting of H or any straight-chain or branched alkyl constituent having from about one carbon atom to about six carbon atoms; and X is selected from the group consisting of tetrafluoroborate, perchlorate, trifluoromethane sulfonate, hexafluorophosphate, any halogen and any combination thereof.

113. The process for using an electrochemichromic solution according to claim 89, wherein said solvent of siad electrochemichromic solution is a member selected from the group consisting of acetonitrile, 3-hydroxypropionitrile, methoxypropionitrile, 3-ethoxypropionitrile, propylene carbonate, 2-acetylbutyrolactone, cyanoethyl sucrose, γ-butyrolactone, 2-methylglutaronitrile, N,N'-dimethylformamide, 3-methylsulfolane, methylethyl ketone, cyclopentanone, cyclohexanone, benzoyl acetone, 4-hydroxy-4-methyl-2-pentanone, acetophenone, glutaronitrile, 3,3'-oxydipropionitrile, 4-methoxyethyl ether, triethylene glycol dimethyl ether and any combination thereof.

114. The process for using an electrochemichromic solution according to claim 89, wherein said solvent of siad electrochemichromic solution is acidic.

115. The process according to claim 114, wherein said solvent is rendered acidic by employing as a solvent component an acidic material selected from the group consisting of acetic acid, any hydrogen halide gas in solution, perchloric acid, 2-acetylbutyrolactone, 3-hydroxypropionitrile and any combination thereof.

116. The process for using an electrochemichromic solution according to claim 89, wherein the total concentration of said anodic compound and said cathodic compound in said electrochemichromic solution is in the range of about 0.005M to about 0.5M.

117. The process for using an electrochemichromic solution according to claim 89, wherein said redox agent which has previously contacted said anodic compound of said electrochemichromic solution is a reducing agent capable of causing an electrochemichromic compound to assume a decreased valence state upon contacting therewith as compared with that valence state possessed by said electrochemichromic compound prior to having been contacted with said reducing agent.

118. The process according to claim 117, wherein said reducing agent is zinc.

119. The process for using an electrochemichromic solution according to claim 89, wherein said electrochemichromic solution further comprises a constituent selected from the group consisting of ultraviolet stabilizing agents, electrolytic material and any combination thereof.

120. The process of using an electrochemichromic solution according to claim 89, wherein said applied potential is introduced to said electrochemichromic solution in the range of about 0.001 volts to about 5 volts.

121. The electrochemichromic device according to claim 90, wherein said anodic compound of said electrochemichromic solution of said device is a member selected from the group consisting of chemical compounds of the following formulae:

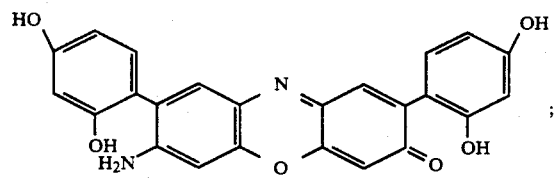

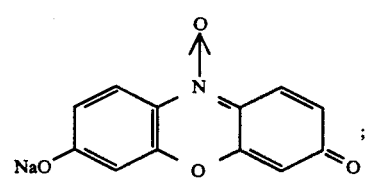

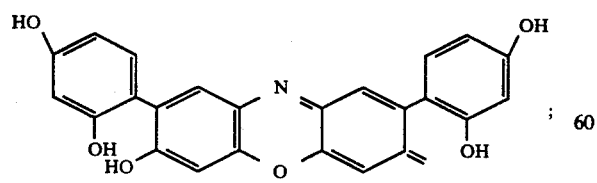

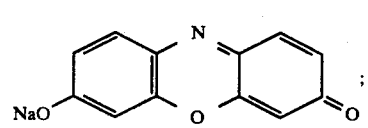

-continued

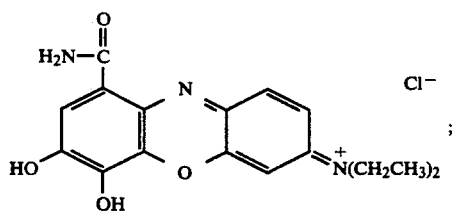

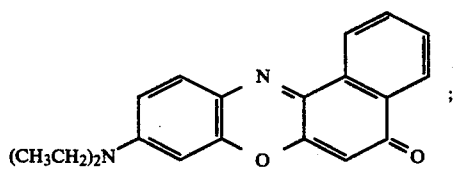

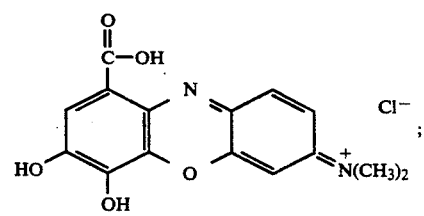

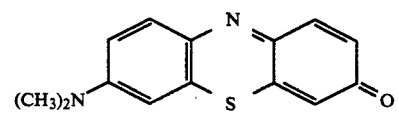

and any combination thereof.

122. The electrochemichromic device according to claim 90, wherein said anodic compound of said electrochemichromic solution of said device is

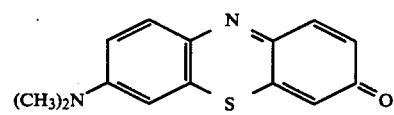

123. The electrochemichromic device according to claim 90, wherein said cathodic compound of said electrochemichromic solution of said device is a member selected from the group consisting of chemical compounds of the following formulae:

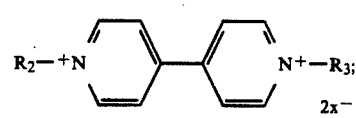

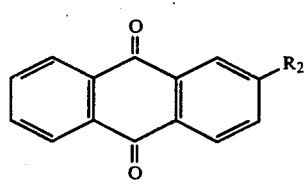

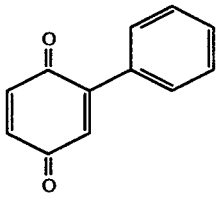

wherein

R₂ and R₃ may be the same or different and each may be selected from the group consisting of H or any straight-chain or branched alkyl constituent having from about one carbon atom to about six carbon atoms; and X is selected from the group consisting of tetrafluoroborate, perchlorate, trifluoromethane sulfonate, hexafluorophosphate, any halogen and any combination thereof.

124. The electrochemichromic device according to claim 90, wherein said solvent of said electrochemichromic solution of said device is member selected from the group consisting of acetonitrile, 3-hydroxypropionitrile, methoxypropionitrile, 3-ethoxypropionitrile, propylene carbonate, 2-acetylbutyrolactone, cyanoethyl sucrose, γ-butyrolactone, 2-methylglutaronitrile, N,N'-dimethylformamide, 3-methylsulfolane, methylethyl ketone, cyclopentanone, cyclohexanone, benzoyl acetone, 4-hydroxy-4-methyl-2-pentanone, acetophenone, glutaronitrile, 3,3'-oxydipropionitrile, 2-methoxyethyl ether, triehtylene glycol dimethyl ether and any combination thereof.

125. The electrochemichromic device according to claim 90, wherein said solvent of said electrochemichromic solution of said device is acidic.

126. The electrochemichromic device according to claim 125, wherein said solvent is rendered acidic by employing as a solvent component an acidic material selected from the group consisting of acetic acid, any hydrogen halide gas in solution, perchloric acid, 2-acetylbutyrolactone, 3-hydroxypropionitrile and any combination thereof.

127. The electrochemichromic device according to claim 90, wherein the total concentration of said anodic compound and said cathodic compound in said electrochemichromic solution of said device is in the range of about 0.005M to about 0.5M.

128. The electrochemichromic device according to claim 90, wherein said redox agent which has previously contacted said anodic compound of said electrochemichromic solution of said device is a reducing agent capable of causing an electrochemichromic compound to assume a decreased valence state upon contacting therewith as compared with that valence state possessed by said electrochemichromic compound prior to having been contacted with said reducing agent.

129. The electrochemichromic device according to claim 128, wherein said reducing agent is zinc.

130. The electrochemichromic device according to claim 90, wherein said electrochemichromic solution of said device further comprises a constituent selected from the group consisting of ultraviolet stabilizing agents, electrolytic materials and any combination thereof.

131. The electrochemichromic device according to claim 90, wherein said applied potential is introduced to said electrochemichromic solution of said device in the range of about 0.002 volts to about 5 volts.

132. The process for using an electrochemichromic solution according to claim 89, wherein that quantity of said redox agent which has remained unreacted after having previously contacted said anodic compound of said electrochemichromic solution has been removed therefrom.

133. The electrochemichromic device according to claim 90, wherein that quantity of said redox agent which has remained unreacted after having previously contacted said anodic compound of said device has been removed from said electrochemichromic solution.

* * * * *

UNITED STATES PATENT AND TRADEMARK OFFICE
CERTIFICATE OF CORRECTION

PATENT NO. : 5,239,405
DATED : August 24, 1993
INVENTOR(S) : DESARAJU V. VARAPRASAD ET AL.

It is certified that error appears in the above-identified patent and that said Letters Patent is hereby corrected as shown below:

On the title page:

AT [56] REFERENCED CITED

Other Publications, under I.V. Shelepin et al. (first occurrence) "*Electrokhima*," should read --*Electrokhimya*,--.

AT [57] ABSTRACT

Line 11, "involve" should read --involves--.

COLUMN 1

Line 31, "*himva*," should read --*himya*,--.

COLUMN 2

Line 15, "involve" should read --involves--.

COLUMN 3

Line 51, "to a" should read --to refer to a--.

COLUMN 4

Line 1, "solution —and" should read --solution—and--.
Line 42, "Self-erasing" should read --¶ "Self-erasing"--.
Line 44, "hwen" should read --when--.
Line 53, "pr" should read --or--.

UNITED STATES PATENT AND TRADEMARK OFFICE
CERTIFICATE OF CORRECTION

PATENT NO. : 5,239,405

DATED : August 24, 1993

INVENTOR(S) : DESARAJU V. VARAPRASAD ET AL.

It is certified that error appears in the above-identified patent and that said Letters Patent is hereby corrected as shown below:

COLUMN 5

Line 2, "formula" should read --formula:--.
Line 12, "wherein R and R" should read
   --¶ wherein R and $R_1$--.
Line 19, "OS;" should read --O, S;--.
Line 20, "R ," should read --$R_1$,--.

COLUMN 6

Line 8, "NRR ," should read --$NRR_1$,--.
Line 12, "($BF_4$)," should read --($BF_4^-$),--.
Line 13, "($ClO_4$)," should read --($ClO_4^-$),--.
Line 22, "formulae" should read --formulae:--.

COLUMN 7

Line 26, "formulae" should read --formulae:--.
Line 56, "$BF_4$, $ClO_4$," should read --$BF_4^-$, $ClO_4^-$,--.
Line 57, "$CF_3SO_3$, $PF_6$," should read --$CF_3SO_3^-$, $PF_6^-$,--.
Line 61, "$ClO_4$," should read --$ClO_4^-$,--.

COLUMN 9

Line 16, "nonexhaustive" should read --non-exhaustive--.
Line 65, "pretreated" should read --pre-treated--.

COLUMN 12

Line 67, "EVClO.," should read --$EVClO_4$,--.

UNITED STATES PATENT AND TRADEMARK OFFICE
CERTIFICATE OF CORRECTION

PATENT NO. : 5,239,405
DATED : August 24, 1993
INVENTOR(S) : DESARAJU V. VARAPRASAD ET AL.

It is certified that error appears in the above-identified patent and that said Letters Patent is hereby corrected as shown below:

COLUMN 13

Line 32, "to;" should read --to,--.
Line 47, "solutions," should read --solution,--.

COLUMN 14

Line 13, "in direc-" should read --in opposite direc- --.
Line 14, "opposite directions" should be deleted.
Line 15, "relative to one another—i.e.," should be deleted.
Line 25, "300 521" should read --300 Å--.

COLUMN 15

Line 20, close up right margin.
Line 21, close up left margin.

COLUMN 16

Line 47, "clear," should read --clear--.
Line 64, "transmitted" should read --be transmitted--.
Line 68, "transmitted" should read --be transmitted--.

UNITED STATES PATENT AND TRADEMARK OFFICE
CERTIFICATE OF CORRECTION

PATENT NO. : 5,239,405

DATED : August 24, 1993

INVENTOR(S) : DESARAJU V. VARAPRASAD ET AL.

It is certified that error appears in the above-identified patent and that said Letters Patent is hereby corrected as shown below:

COLUMN 18

Line 2, "EVD1O$_4$" should read --EVC1O$_4$--.
Line 4, "dro5," should read --dro-5,--.
Line 9, "EVCLO$_4$" should read --EVC1O$_4$--.
Line 16, "combination" should read --combination--.
Line 29, "EVCLO$_4$" should read --EVC1O$_4$--.
Line 44, "Illuminate A)" should read --Illuminant A)--.
Line 55, "*supra,*" should read --supra,--.

COLUMN 19

Line 65, "concimitant" should read --concomitant--.

COLUMN 20

Line 4, "EVCLO$_4$" should read --EVC1O$_4$--.
Line 8, "UNINUL400" should read --"UVINUL 400"--.
Line 12, "EVCLO$_4$" should read --EVC1O$_4$--.
Line 14, "comprisnig" should read --comprising--.

COLUMN 21

Line 3, "EVC1O" should read --EVC1O$_4$--.
Line 5, "9%" should read --69%--.
Line 7, "supra" should read --supra,--.
Line 36, "*supra.*" should read --supra.--.
Line 48, "EVC1O" should read --EVC1O$_4$--.
Line 56, "EVC1O" should read --EVC1O$_4$--.

UNITED STATES PATENT AND TRADEMARK OFFICE
CERTIFICATE OF CORRECTION

PATENT NO. : 5,239,405

DATED : August 24, 1993

INVENTOR(S) : DESARAJU V. VARAPRASAD ET AL.

It is certified that error appears in the above-identified patent and that said Letters Patent is hereby corrected as shown below:

COLUMN 22

Line 23, "*supra.*" should read supra.--.
Line 48, "supra" should read --supra,--.

COLUMN 23

Line 26, "to" should read --in--.
Line 60, "EVClO" should read --EVClO$_4$--.
Line 62, "69% 3-oxydipropionitrile" should read --69% 3-hydroxypropionitrile,-- and "3,3'-ocydipro-" should read --3,3'-oxydipro- --.

COLUMN 24

Line 29, "EVClO" should read --EVClO$_4$--.
Line 34, "to this" should read --in this--.

COLUMN 25

Line 2, "to" should read --in--.
Line 30, "oxidecoated" should read --oxide-coated--.

COLUMN 26

Line 35, "solvent" should read --solvent,--.
Line 54, "R and R" should read --R and $R_1$--.
Line 61, "R ," should read --$R_1$,--.

UNITED STATES PATENT AND TRADEMARK OFFICE
CERTIFICATE OF CORRECTION

PATENT NO. : 5,239,405
DATED : August 24, 1993
INVENTOR(S) : DESARAJU V. VARAPRASAD ET AL.

It is certified that error appears in the above-identified patent and that said Letters Patent is hereby corrected as shown below:

COLUMN 27

Line 4, "each A" should read --when A--.
Line 67, "electrochemical" should read
--electrochemichromic---.

COLUMN 28

Line 60, "  " should read --  --.

COLUMN 32

Line 23, "7-butyrolactone," should read
--γ-butyrolactone,--.
Line 24, "3,3'-ethylsulfolane," should read
--3-methylsulfolane,--.
Line 63, "3-hydroxypropionitrite," should read
--3-hydroxypropionitrile,--.

COLUMN 33

Line 9, "TINUVIN P," should read --"TINUVIN P",--.
Line 44, "comprises:" should read --comprising:--.

COLUMN 34

Line 52, "formulae" should read --formulae:--.

UNITED STATES PATENT AND TRADEMARK OFFICE
CERTIFICATE OF CORRECTION

PATENT NO. : 5,239,405
DATED : August 24, 1993
INVENTOR(S) : DESARAJU V. VARAPRASAD ET AL.

Page 7 of 8

It is certified that error appears in the above-identified patent and that said Letters Patent is hereby corrected as shown below:

COLUMN 37

Line 67, "presented" should read --represented--.

COLUMN 40

Line 68, "comprises:" should read --comprising:--.

COLUMN 41

Line 3, "sealing" should read --(b) sealing--.

COLUMN 42

Line 20, "second" should read --said second--.
    Line 42, "member-selected" should read
            --member selected--.
    Line 47, "the the" should read --the--.

COLUMN 43

Line 26, 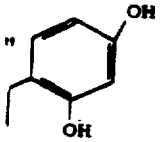 should read -- 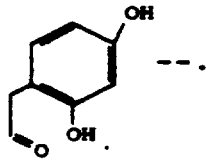 --.

Line 43, "$\overset{+}{N}(CH_2CH_2CH_3)_2$" should read --$\overset{+}{N}(CH_2CH_3)_2$--.

UNITED STATES PATENT AND TRADEMARK OFFICE
CERTIFICATE OF CORRECTION

PATENT NO. : 5,239,405
DATED : August 24, 1993
INVENTOR(S) : DESARAJU V. VARAPRASAD ET AL.

It is certified that error appears in the above-identified patent and that said Letters Patent is hereby corrected as shown below:

COLUMN 45

Line 26, "material" should read --materials--.
Line 29, "of" should read --for--.

COLUMN 47

Line 32, "triehtylene" should read --triethylene--.

COLUMN 48

Line 28, "0.002 volts" should read --0.001 volts--.

Signed and Sealed this

Ninth Day of August, 1994

Attest:

BRUCE LEHMAN

Attesting Officer     Commissioner of Patents and Trademarks